US012612132B2

(12) United States Patent
    Nicolai

(10) Patent No.: US 12,612,132 B2
(45) Date of Patent: Apr. 28, 2026

(54) DATA PROCESSING DEVICE AND COMPUTER-IMPLEMENTED METHOD FOR SYNCHRONIZED SHIFTING OF BICYCLE GEARBOXES, BICYCLE GEARBOX AND METHOD OF OPERATING THE SAME

(71) Applicant: Karlheinz Nicolai, Duingen Lübbrechtsen (DE)

(72) Inventor: Karlheinz Nicolai, Duingen Lübbrechtsen (DE)

( * ) Notice: Subject to any disclaimer, the term of this patent is extended or adjusted under 35 U.S.C. 154(b) by 0 days.

(21) Appl. No.: 18/671,045

(22) Filed: May 22, 2024

(65) Prior Publication Data

US 2025/0050971 A1     Feb. 13, 2025

(30) Foreign Application Priority Data

Aug. 9, 2023    (DE) .......................... 102023121284.2

(51) Int. Cl.
    B62M 25/08        (2006.01)
    B62M 11/06        (2006.01)
    B62M 11/14        (2006.01)
(52) U.S. Cl.
    CPC ............. B62M 25/08 (2013.01); B62M 11/06 (2013.01); B62M 11/14 (2013.01)
(58) Field of Classification Search
    CPC ...... B62M 25/08; B62M 11/06; B62M 11/14; B62M 6/55; B62J 45/411; B62J 45/413; F16H 2302/06; F16H 61/08; F16H 37/043; F16H 2306/21; F16H 61/0213;
    (Continued)

(56) References Cited

U.S. PATENT DOCUMENTS 4,942,530 A * 7/1990 Boda .................. F16H 61/0437
                                                    701/66
2011/0130242 A1   6/2011 Gobel

FOREIGN PATENT DOCUMENTS

DE      102010035776 A1 *  3/2012  ............... B60K 6/48
DE      102016225163 A2   6/2018
JP        2018136020 A    8/2018
            (Continued)

OTHER PUBLICATIONS

Extended European Search Report for European Patent Application No. 24175243.5 with English Translation, dated Nov. 13, 2024, 28 pages.
                        (Continued)

*Primary Examiner* — Tisha D Lewis
(74) *Attorney, Agent, or Firm* — Edell, Shapiro & Finnan, LLC

(57)                ABSTRACT

A data processing device and a computer-implemented method for controlling a gear change in a bicycle gearbox for a bicycle with or without an auxiliary motor, in particular a bottom bracket gearshift device or a hub gear, from one gear directly into another gear by automatic actuation of a first and a second clutch actuator. A bicycle gearbox with such a data processing device as well as to a method of executing a gear change. The data processing device is configured to receive at least one switching parameter representative of a state of the bicycle gearbox, and to output an actuation signal for actuating the first and the second clutch actuator depending on the at least one switching parameter and a gear change signal representing a command for a gear change.

19 Claims, 8 Drawing Sheets

(58) Field of Classification Search
CPC ........ F16H 61/702; F16H 3/0915; F16H 3/10;
F16H 2003/0811
See application file for complete search history.

(56) References Cited

FOREIGN PATENT DOCUMENTS

| WO | 2015074885 A1 | 5/2015 | |
| WO | 2022203221 A1 | 9/2022 | |
| WO | WO-2022218862 A1 * | 10/2022 | ............ B62M 11/06 |
| WO | WO-2022248134 A1 * | 12/2022 | .............. B62J 43/30 |

OTHER PUBLICATIONS

"Händlerbetriebsanleitung Shimano Schaltwerk (Di2)", 6.Januar 2023 (Jan. 6, 2023), Seiten 1-59, XP093217690, Gefunden im Internet: URL:https://si.shimano.com/de/pdfs/dm/RARD010/DM-RARD010-03-GER.pdf, 59 pages (Translation: "Dealer operating instructions Shimano rear derailleur (Di2)", Jan. 6, 2023 (Jan. 6, 2023), pp. 1-59, XP093217690, Found on the Internet: URL:https://si.shimano.com/de/pdfs/dm/RARD010/DM-RARD010-03-GER.pdf).

* cited by examiner

DATA PROCESSING DEVICE AND COMPUTER-IMPLEMENTED METHOD FOR SYNCHRONIZED SHIFTING OF BICYCLE GEARBOXES, BICYCLE GEARBOX AND METHOD OF OPERATING THE SAME

CROSS-REFERENCE TO RELATED APPLICATION

This application claims priority under 35 U.S.C. § 119 to German Patent Application No. 102023121284.2 filed on Aug. 9, 2023, the disclosure of which is hereby incorporated by reference in its entirety.

FIELD OF INVENTION

The present invention relates to a data processing device and a computer-implemented method for controlling a gear change in a bicycle gearbox for a bicycle with or without an auxiliary motor from one engaged gear directly to another gear to be engaged by automatic actuation of a first clutch actuator and at least a second clutch actuator. The bicycle gearbox may, in particular, be a bottom bracket gearshift device, a hub gear or a split gear system with a bottom bracket gearshift device and a hub gear combined therewith. The bicycle may also be a multi-track bicycle.

BACKGROUND

Bottom bracket gearshift devices and hub gears are increasingly used as an alternative to classic derailleur gears because the gearbox is here shielded from the outside environment and therefore wears less.

Some bicycle gearboxes require a high mechanical outlay for implementing the gear changes mechanically. For example, rotatable switching shafts are used, which engage and disengage the clutches of individual gear wheel pairings or shift stages via switching cams or a slide control system. The gear engaged results from the combination of the gear wheel pairings that have just been engaged.

For some gear changes, two clutches must be engaged at the same time. When gears are changed in this way, there is a risk that intermediate gears may be engaged, if the two clutches are not engaged at exactly the same time, or that an idling may occur. An intermediate gear is engaged, if one of the two clutches to be engaged for the gear change is engaged before the other clutch, so that another shift stage is unintentionally switched into the power flow through the bicycle gearbox for a short time. This has the effect that the cyclist is briefly compelled to pedal at a pedal frequency that is different from the actually intended. This can lead to a fall if, during an uphill ride, the intermediate gear is too high, so that the pedal frequency will drop to such an extent that the cyclist no longer applies any force to the pedal and falls over. Conversely, an intermediate gear that is too low may have the effect that the cyclist has to pedal too fast for a short time and slips off the pedal.

SUMMARY

It is therefore the object of the present invention to improve a gear change, which takes place in a bicycle gearbox and which requires simultaneous switching of two clutches, in such a way that no intermediate gear and no idling will occur.

According to the present invention, this object is achieved for the data processing device mentioned at the beginning, in that the data processing device is configured to receive at least one switching parameter representative of a state of the bicycle gearbox; to output an actuation signal for actuating the first and the at least second clutch actuator depending on the at least one switching parameter and a gear change signal representing a command for a gear change; wherein the actuation signal contains control data which are representative of points in time in the future at which the first clutch actuator and/or the second clutch actuator will have executed or are to execute a switching movement required for the gear change, and/or of a time interval between the actuation of the first clutch actuator and the actuation of the second clutch actuator, and/or of a switching speed to be set for the first clutch actuator and a switching speed to be set for the second clutch actuator.

In addition, the above object is achieved by a control device including this kind of data processing device and further including an actuating element accessible to a cyclist and configured to generate the gear change signal when actuated by the cyclist.

The above object is additionally achieved by a computer-implemented method of the type mentioned at the beginning, said method including the following steps: receiving at least one switching parameter representative of a current state of the bicycle gearbox; outputting an actuation signal for actuating the first clutch actuator and the at least second clutch actuator depending on the at least one switching parameter and a gear change signal representing a command for a gear change; wherein the actuation signal contains control data which are representative of points in time in the future at which the first clutch actuator and/or the second clutch actuator will have executed or are to execute a switching movement required for the gear change, and/or of a time interval between the actuation of the first clutch actuator and the actuation of the second clutch actuator, and/or of a switching speed of the first clutch actuator and a switching speed of the second clutch actuator.

The present invention additionally relates to a computer program product or a computer-readable data carrier including commands which, when executed by a computer or a data processing device, cause the computer or the data processing device to carry out the computer-implemented method.

In addition, the present invention comprises a bicycle gearbox of the type mentioned at the beginning, which includes: a first clutch configured to be switched between an engaged and a disengaged actuation state; a second clutch configured to be switched between an engaged and a disengaged actuation state; a first clutch actuator for changing the actuation state of the first clutch; a second clutch actuator for changing the actuation state of the second clutch; a first gear wheel pairing including a first gear wheel, the fixation of the first gear wheel relative to an element of the bicycle gearbox being dependent on the actuation state of the first clutch; a second gear wheel pairing including a second gear wheel, the fixation of the second gear wheel relative to an element of the bicycle gearbox being dependent on the actuation state of the second clutch; a gear and a further gear, the first clutch and the second clutch each having in the one gear an actuation state which is different from the actuation state in the other gear; and a data processing device as above or a control device as above.

Finally, the present invention also relates to a method of executing a gear change in a bicycle gearbox for a bicycle with or without an auxiliary motor, from one gear directly to another gear by automatic actuation of a first clutch actuator and a second clutch actuator, wherein, during a gear change, the first clutch actuator and the second clutch actuator are automatically actuated at different points in time and/or at different switching speeds, depending on the current state of the bicycle gearbox.

The above-mentioned solution according to which the point in time of the start and/or the end of a switching movement of the two clutch actuators to be actuated for the gear change, the time interval between the actuation of the two clutch actuators to be actuated for the gear change and/or their switching speed are made dependent on the current state of the bicycle gearbox allows idling and intermediate gears to be reliably avoided during a gear change that requires the simultaneous actuation of two clutches. The gear change can be better controlled or even feedback-controlled.

The invention can be improved still further by the following mutually independent, arbitrarily combinable further developments, each of which is advantageous on its own. In this context, further-developing method features can also serve to improve the device in that the device is configured for executing the further-developing method step. Analogously, a further-developing device feature can be used to improve the method by executing the step which the device is configured to execute.

In this text, actuation of a clutch is synonymous with engagement, i.e. the provision of a power- or torque-transmitting connection in at least one direction of rotation. The clutches may here in particular be switchable freewheels which transmit a torque in only one direction of rotation, when actuated or, equivalently, when engaged. Compared to a combination of a mere clutch and a freewheel, a switchable freewheel takes up less space and avoids conditions in which the gearbox is temporarily statically overdetermined and may jam. For actuating a clutch, the clutch actuator assigned to this clutch carries out a switching movement. The switching movement may be translational and/or rotational.

In this text, the term "switching" may be used synonymously with "shifting".

"Direct switching" from one gear to the other is intended to express that the cyclist does not intend to engage a further gear between the one gear and the other. The gear change from the one gear to the other is therefore intended to take place directly.

Depending on the structural design of the bicycle gearbox, such a direct gear change may necessitate to actuate not only a first and a second clutch actuator, but also a third clutch actuator and possibly further clutch actuators. This is intended to be expressed by the phrase "at least a second clutch actuator". That which applies to the actuation of the second clutch actuator also applies to the actuation of the third clutch actuator.

The term "receiving" is understood to mean both receiving and actively retrieving a value. Accordingly, the term "a value" means that this value is sent or made available for retrieval.

In addition to the actuation of the first clutch actuator and the second clutch actuator, the gear change may also necessitate the deactivation of a third and of a fourth clutch actuator. The third and fourth clutch actuators correspond to the clutch actuators that had to be actuated for the gear from which the gear change took place. The third and the fourth clutch actuator and the third and the fourth clutch, respectively, will preferably not be deactivated until the first and the second clutch have been actuated. The actuation of the first and of the second clutch can be determined via a switching parameter. Alternatively, the third and the fourth clutch can be deactivated after a predetermined period of time has elapsed after the actuation signal has been issued.

The actuation signal may be a digital signal or an analog signal or a combination of a digital and an analog signal. Accordingly, the control data contained in the actuation signal may be digital or analog. In a further embodiment, the actuation signal may also transmit an electrical power.

In one variant, the actuation signal may have two parts, a first part being sent to the first clutch actuator and a second part being sent to the second clutch actuator, for example via separate lines or, provided with an address block, via a single line. In the simplest case, the time interval between the first and the second part of the actuation signal determines the time interval between the actuation of the first and the second clutch actuator. A current voltage, current intensity, amplitude and/or frequency of the first part may represent the switching speed of the first clutch actuator and a frequency and/or amplitude of the second part may represent a switching speed of the second clutch actuator.

In another variant, the actuation signal may be output as a digital signal via a wired or wireless bus system, for example Bluetooth Low Energy, Bluetooth or ANT+. The data processing device preferably has a data interface that allows the exchange of data with at least one sensor system and/or the clutch actuators via such a wired or wireless bus system.

At least one clutch actuator may be provided with an embedded system configured to control the switching movement of the clutch actuator. The embedded system of a clutch actuator may be connected to the data processing device in a data-transmitting manner. Alternatively, an embedded system of a clutch actuator may also be part of the data processing device or of the control device. An embedded system may be structurally combined with the clutch actuator it controls, e.g. by being arranged in a common housing with other parts of the clutch actuator. Alternatively, the embedded system may also be arranged in spaced relationship with the clutch actuator it controls.

In one embodiment, the data processing device may have one or a plurality of central microprocessors, preferably structurally united in a housing, and may be arranged, for example, in spaced relationship with the clutch actuators and their embedded systems, if provided. In another embodiment, the data processing device and the embedded systems may be structurally united and arranged, for example, in or on the bicycle gearbox.

In a further embodiment, the data processing device may be formed by a distributed system. In this way, the embedded systems of a plurality of clutch actuators can together form the data processing device. Finally, the data processing device may also be formed by only one embedded system. The data processing device may be formed exclusively by software, exclusively by hardware or by a combination of software and hardware.

Via the data interface, one or a plurality of sensor systems, by way of example, can be connected to the data processing device in an analog or digital data-transmitting manner, or the at least one switching parameter can be received.

Also the actuation signal, by way of example, can be output via the data interface.

The first clutch actuator and/or the at least second clutch actuator may have an electric, electromagnetic or magnetic drive. The drive movement generated by the drive can be rotational and/or translational. The drive may, for example, be an electric motor, in particular a stepping motor, a piezo actuator, a shape memory material, a bimetal or a magnet.

In one embodiment, a clutch actuator may only actuate a single clutch at a time. In another embodiment, a clutch actuator may actuate a plurality of clutches at a time. The clutch actuator may, for example, drive a switching shaft with switching cams and/or switching gates, each of which mechanically actuates a clutch.

According to a further aspect, the gear change is controlled by means of a control loop making use of the at least one switching parameter as a control variable. This allows sudden changes in the state of the gearbox, for example sudden changes in the pedaling frequency or the drive torque, to be taken into account while the gear change is still going on. This reduces the risk of idling and unintentional intermediate gears still further. The data processing device may thus, by way of example, be configured to receive at least one current switching parameter during the output of the actuation signal and to change the actuation signal during the output depending on the at least one received switching parameter.

The reference variable of such a control loop may be predetermined as a fixed value and/or determined on the basis of a predetermined transfer function, which determines the reference variable depending on the at least one switching parameter. The reference variable may, for example, be temperature-dependent. Reference variables may be the position of the clutch actuator, its speed and/or its force. If a clutch actuator has one or a plurality of intermediate mechanical elements that actuate the clutch, such as a switching shaft, levers or release rings or slide guides, their position or speed may also be a reference variable.

In one variant, the data processing device may be configured to output a single actuation signal during the entire time required for the gear change. The actuation signal can initiate the gear change once, in the form determined by the control data. The gear change will then take place without any further switching command.

In another variant, the actuation signal is output until the gear change has been carried out, for example over a certain period of time or until an event occurs that depends, by way of example, on at least one switching parameter. Such an event may be that at least one switching parameter assumes a predetermined value.

In a further embodiment, the actuation signal can be changed during output. Such a case occurs, for example, if the actuation signal is analog and a characteristic of the actuation signal, for example the voltage, current intensity and/or frequency, is representative of the switching speed. If it is necessary to change the switching speed of one or both clutch actuators due to a change in the state of the bicycle gearbox, the respective characteristic of the actuation signal and the control data, respectively, will be changed during the output.

In particular if the actuation signal is output in digital form, a new actuation signal can be output depending on at least one current switching parameter, said new actuation signal containing updated control data, in particular at least one updated switching speed.

According to a further embodiment, the data processing device may have a routine for controlling the force, position and/or speed of at least one clutch actuator depending on the at least one switching parameter. The force, position and/or speed control of a clutch actuator substantially increases the accuracy of clutch actuation and thus of a gear change. In the case of position control, the clutch actuator is moved to a predetermined position. The position may be contained in the actuation signal, for example the control data. In the case of position control, the switching movement of the clutch actuator can be predetermined by a temporal sequence of switching positions. Position control can be used for precisely synchronizing the switching movement of the first clutch actuator in relation to the second or further clutch actuators.

In the case of speed control, the clutch actuator is controlled in such a way that it observes a predetermined switching speed. During a gear change, different switching speeds can be predetermined sequentially in time, as described above.

In the case of force control, the at least one clutch actuator is operated in such a way that it is operated with a predetermined force and thus equivalently with a predetermined acceleration. Such force control can take place by monitoring current magnitudes.

Alternatively or cumulatively to a routine for force, position and/or speed control, the data processing device can have a transfer function, as has already been indicated above. Through the transfer function, an actuation signal and the control data, respectively, are assigned, in particular clearly assigned, to the at least one switching parameter. The transfer function may be a look-up table, an analytical function or a combination comprising a look-up table and an analytical function. The transfer function may be determined experimentally. For example, a respective switching parameter that leads to a fast gear change without idling and without any intermediate gears can be determined experimentally for different states of the bicycle gearbox.

The data processing device preferably has a memory in which the routine for force, position and/or speed control and/or the transfer function are stored.

The at least one switching parameter may be included in the group of switching parameters following hereinafter, with any combination of switching parameters being possible.

For example, the switching parameter may be a switching parameter that is representative of a torque applied to at least one gear shaft of the bicycle gearbox. The gear shaft may be a drive or input shaft, a control shaft and/or a driven shaft. Also the bottom bracket shaft is to be regarded as a gear shaft within the framework of this text. For each gear shaft, a separate switching parameter representative of the torque applied to the respective gear shaft may be provided.

The at least one switching parameter may be representative of a rotation rate of at least one gear shaft of the bicycle gearbox. This may be the same gear shaft for which also the switching parameter representative of the torque applied to this gear shaft is provided, or some other gear shaft. Also in this case, a separate switching parameter representative of the rotation rate of the respective gear shaft may be provided for each gear shaft.

The same applies to a switching parameter that is representative of a current angular position of at least one gear shaft of the bicycle gearbox. A switching parameter representative of the angular position of the respective gear shaft can be determined on each individual gear shaft.

Preferably, the torque, speed and/or angular position of all the gear shafts are taken into account in a respective separate switching parameter. It should be noted that it will be sufficient to provide only one or two of these switching parameters for each gear shaft. For example, the data processing device may be configured to determine, by simple temporal derivation, the rotation rate from a switching parameter that is representative of an angular position of a gear shaft. The angular position can be determined from a switching parameter, which is representative of a rotation rate of a gear shaft, by time integration.

Likewise, in certain embodiments, the angular position of different gear shafts can be calculated on the basis of the angular position of a single gear shaft because the transmission ratios between the gear shafts are constant in the respective gear stages.

The data processing device may be configured to calculate the currently engaged gear depending on the ratio of the rotation rate of an input shaft or drive shaft of the bicycle gearbox to the rotation rate of an output shaft or driven shaft of the bicycle gearbox.

In addition, the data processing device may be configured to calculate a power applied to a gear shaft from the torque applied to this gear shaft and the switching parameter representing the rotation rate.

A switching parameter can be representative of a current position of the first clutch actuator. This switching parameter can be used to determine to what extent the clutch actuated by the first clutch actuator is engaged and which shifting distance still has to be covered before the clutch will be fully engaged. Accordingly, a switching parameter can be representative of a current position of the second clutch actuator.

The data processing device may be configured to determine the currently engaged gear on the basis of the switching parameter representative of the position of the first clutch actuator and the switching parameter representative of the position of the second clutch actuator.

On the basis of the switching parameter representative of the current position of a clutch actuator, the data processing device can determine the status of the gear change. The data processing device may, for example, be configured to compare the switching parameter representative of the current position of a clutch actuator with a predetermined value representative of an initial position, so as to determine the end of the gear change. Alternatively or cumulatively, the data processing device may be configured to compare the switching parameter representative of the current position of a clutch actuator with a value representative of the end position of the clutch actuator, so as to determine the completion of the gear change process.

If a clutch actuator actuates a plurality of clutches, each clutch may have assigned thereto an initial and/or end position within the overall translational and/or rotational stroke of the clutch actuator. This is the case, for example, if a plurality of clutches is driven by one switching shaft. For example, the clutch actuator may drive a rotational movement of the switching shaft and each clutch may only be actuated in certain angular ranges of the switching shaft. The clutch actuated can be determined via the switching parameter representing the angular position of the clutch actuator.

A switching parameter may be representative of a switching force generated by the first clutch actuator. A further switching parameter may be representative of a switching force generated by the second clutch actuator. Such a switching parameter can be determined directly by measuring the switching force. However, also an electrical power supplied to a clutch actuator may be representative of the switching force. The electrical power can be determined, for example, by means of the current intensity, the current voltage and/or the current frequency made available to a clutch actuator as a drive current. Furthermore, the acceleration of the movement of a clutch actuator may be representative of the switching force. By means of a switching parameter representing the switching force, a force control of a clutch actuator can be realized. By means of the current position of a clutch actuator, the aforementioned position control of the clutch actuator can be implemented.

A switching parameter may be representative of a current speed of movement of the first clutch actuator. A switching parameter may be representative of the current speed of movement of the second clutch actuator. For example, making use of such a switching parameter, the above-mentioned speed control of a clutch actuator can be implemented as described above.

A switching parameter may be representative of the engaged gear. The data processing device may be configured to calculate the engaged gear on the basis of the rotation rate of the drive shaft and the driven shaft. Alternatively or cumulatively, the data processing device may be configured to calculate the engaged gear on the basis of the switching parameters that are representative of the position of the first clutch actuator and of the second clutch actuator.

A switching parameter may be representative of the temperature of the bicycle gearbox. The temperature of the bicycle gearbox may influence the response times of the clutch actuators, so that taking this temperature into account when actuating the clutch actuators will improve the synchronization of the clutches.

The two clutches to be actuated during the gear change may each have an input side and an output side, which must be engaged during actuation. One of the input side and output side may have at least one freewheel pawl, freewheel claw or at least one freewheel tooth, which will be summarized hereinafter under the term freewheel pawl. The data processing device may be configured to determine, by means of switching parameters, the current relative position of the input side and the output side of the two clutches to be switched. On the basis of this current relative position, the data processing device can calculate the shifting distance up to the point of engagement of the input and output sides and, on the basis of the relative speeds of the input and output sides, the time remaining for the shifting distance. In this way, idling, among other things, is minimized.

The gear change signal may include one or a plurality of gear change parameters. A gear change parameter may, for example, be representative of the switching direction. A gear change parameter may be representative of the number of gears to be skipped during the requested gear change. A gear change parameter may be representative of the gear currently engaged or its gear number. A gear change parameter may be representative of the gear to be engaged or its gear number. The data processing device may be configured to determine the switching direction from the gear change parameter representing the gear currently engaged and the gear change parameter representing the gear to be engaged.

The gear change signal may be generated by the cyclist himself, as is the case with a manual switching operation, by way of example. The data processing device may, for example, have a manual mode that allows the cyclist to carry out a manual switching operation. Alternatively or cumulatively, the data processing device may be configured to carry out a gear change automatically. For this purpose, the data processing device may have an automatic mode, in which a gear change signal is automatically generated internally in the data processing device, in particular depending on the at least one switching parameter, without requiring a command on the part of the cyclist.

For example, the data processing device has stored therein a target pedaling frequency, and the data processing device is configured to generate the gear change signal depending on a deviation of the current pedaling frequency from the target pedaling frequency. The current pedaling frequency may be averaged over time, e.g. over 3, 5 or 10 seconds. The pedaling frequency corresponds here to the rotation rate of the bottom bracket shaft. The data processing device is configured to calculate the gear to be engaged that will lead to a transmission ratio of the bicycle gearbox which, at the current pedaling frequency, will lead after the gear change to a pedaling frequency that comes closest to the target pedaling frequency. For example, if the current pedaling frequency is more than a predetermined value above the target pedaling frequency, downshifting by one or more gears will be executed, and if the current pedaling frequency is more than a predetermined value below the target pedaling frequency, upshifting by one or more gears will be executed.

The automatic gear change may, alternatively or cumulatively, depend on a predetermined target torque, e.g. at the bottom bracket shaft. For example, one embodiment may provide that an automatic gear change will only take place, if the torque at the bottom bracket shaft exhibits a predetermined deviation from the target torque.

The first and the second clutch actuator may be part of the control device and/or part of the bicycle gearbox. Preferably, the first and the second clutch actuators can be connected or are connected to the data processing device in a data-transmitting, wireless and/or wired manner.

For detecting the at least one switching parameter, the control device and/or the bicycle gearbox may include at least one of the sensor systems following hereinafter.

The sensor system may be a sensor system configured to detect a current torque, applied to at least one gear shaft of the bicycle gearbox, as a switching parameter. This sensor system may be arranged directly on the gear shaft. The sensor system may include a torque sensor.

The sensor system may be a sensor system configured to detect a current rotation rate of at least one gear shaft of the bicycle gearbox as a switching parameter. This sensor system may be arranged directly on the gear shaft. The sensor system may include a tachometer, e.g. a resolver.

The sensor system may be a sensor system configured to detect a current angular position of at least one gear shaft of the bicycle gearbox as a switching parameter. This sensor system may be arranged directly on the gear shaft. It may, for example, include an angle meter or a rotary encoder.

The sensor system may be a sensor system configured to detect a current drive power, applied to at least one gear shaft of the bicycle gearbox, as a switching parameter. This sensor system may be arranged directly on the gear shaft. The sensor system may include a power meter. This sensor system may be configured to additionally detect the respective rotation rate and the respective torque as a switching parameter.

The gear shaft may be a control shaft, a drive shaft or a driven shaft or it may be a shaft of the clutch actuator. A sensor system as described above may be located on each of these shafts. In particular, the clutches that are actuatable by the first and/or second clutch actuator may be arranged on the control shaft.

The sensor system may be a sensor system configured to detect a current position of the first clutch actuator as a switching parameter. The sensor system may be arranged on the first clutch actuator or integrated in the first clutch actuator. The sensor system may include a position sensor, an angle meter or a rotary encoder.

The sensor system may be a sensor system that detects a current switching force, generated by the first clutch actuator, as a switching parameter. The sensor system may be arranged on the first clutch actuator or integrated in the first clutch actuator. The sensor system may include an accelerometer or a current sensor or a sensor that detects an electrical power.

The sensor system may be a sensor system that detects a current switching power, supplied to the first clutch actuator, as a switching parameter. The sensor system may be arranged on the first clutch actuator or integrated in the first clutch actuator. The sensor system may include a sensor that detects an electrical power supplied to the first clutch actuator.

The sensor system may be a sensor system that detects a current speed of movement of the first clutch sensor as a switching parameter. The sensor system may be arranged on the first clutch actuator or integrated in the first clutch actuator. The sensor system may include a tachometer.

The sensor system may be a sensor system configured to detect a current position of the second clutch actuator as a switching parameter. The sensor system may be arranged on the second clutch actuator or integrated in the second clutch actuator. The sensor system may include a position sensor, an angle meter or a rotary encoder.

The sensor system may be a sensor system that detects a current switching force, generated by the second clutch actuator, as a switching parameter. The sensor system may be arranged on the second clutch actuator or integrated in the second clutch actuator. The sensor system may include an accelerometer or a current sensor or a sensor that detects an electrical power.

The sensor system may be a sensor system that detects a current switching power, supplied to the second clutch actuator, as a switching parameter. The sensor system may be arranged on the second clutch actuator or integrated in the second clutch actuator. The sensor system may include a sensor that detects an electrical power supplied to the second clutch actuator.

The sensor system may be a sensor system that detects a current speed of movement of the second clutch sensor as a switching parameter. The sensor system may be arranged on the second clutch actuator or integrated in the second clutch actuator. The sensor system may include a tachometer.

The sensor system may be a sensor system that detects a current temperature of the bicycle gearbox as a switching parameter.

In one embodiment, the bicycle gearbox may include a first and a second partial gearbox. The first clutch actuator, for example, is part of the first partial gearbox. The first partial gearbox may include a plurality of shift stages, each having assigned thereto a clutch. The first clutch actuator is preferably configured to actuate all or at least one clutch of the first partial gearbox. The clutches of the first partial gearbox are preferably configured as switchable freewheels. In a different embodiment, the first partial gearbox may include a plurality of clutch actuators, and each clutch actuator actuates a different clutch or different clutches.

The respective first and/or second clutches may be part of a set of clutches that can only be switched in common because they are connected to a clutch actuator, e.g. via a mechanism such as a switching shaft with cams and/or slide guides.

The second clutch actuator may be part of the second partial gearbox. The second partial gearbox may include a plurality of shift stages, each having assigned thereto a clutch. The second clutch actuator is preferably configured to actuate all the clutches or at least one clutch of the second partial gearbox. The clutches of the second partial gearbox are preferably configured as switchable freewheels. In a different embodiment, the second partial gearbox may include a plurality of clutch actuators, and each clutch actuator actuates a different clutch or different clutches.

The individual shift stages of the first and/or second partial gearbox may include spur gears, which are part of a spur gearbox or a planetary gearbox.

The shift stages of a partial gearbox may include idler wheels, which are rotatably mounted on a control shaft and connectable to the control shaft in at least one direction of rotation in a rotationally rigid manner by means of a clutch actuated by the first or second clutch actuator. The idler wheels of the first partial gearbox may be in permanent engagement with driving gear wheels which are seated non-rotatably on the drive shaft of the bicycle gearbox. The idler wheels of the second partial gearbox may be in permanent engagement with driven gears which are seated non-rotatably on a driven shaft of the bicycle gearbox. A gear wheel pairing consisting of an idler wheel and a driving gear wheel or a driven gear wheel forms a respective shift stage.

In the case of such an embodiment, the gear engaged is determined according to which idler wheel and, consequently, which shift stage of the first partial gearbox and which idler wheel and, consequently, which shift stage of the second gearbox is fixed relative to an element of the bicycle gearbox at the time in question. For some gear changes, a clutch of the first partial gearbox and a clutch of the second partial gearbox must be actuated simultaneously. Once these clutches have been actuated, the clutches previously actuated at the beginning of the gear change can be deactivated.

The element relative to which the idler wheel or a gear wheel of a shift stage is fixed by a clutch to be switched may, for example, be a gear shaft or an element fixed to a housing or a frame, such as a housing part. The gear shaft may, in particular, be the gear shaft on which the idler wheels are mounted, in the present case e.g. the control shaft.

The data processing device may have stored therein the transmission ratios of the shift stages of the bicycle gearbox. The data processing device may have stored therein transfer functions of at least individual shift stages. The transfer functions are representative of the time spans of the individual clutches within which a respective non-actuated clutch is completely switched from the output of the actuation signal onwards. The transfer functions may depend on the switching parameters.

The data processing device may be configured to calculate the relative positions and/or rotation rates of the input sides and the output sides of the clutches to be actuated, depending on the shift stages of the engaged gear and the rotational speed of at least two gear shafts.

For example, the angular position and/or the rotation rate of an input side, which is non-rotatably connected to the control shaft, of a clutch to be actuated can be determined from the rotation rate of the control shaft. If the angular position and/or the rotation rate of the control shaft is not measured directly, it can be calculated either as described above by temporal derivation or integration of a movement variable of the control shaft or on the basis of the transmission ratio of the engaged shift stage driving the control shaft. If the output side of the clutch to be actuated is non-rotatably connected to an idler wheel, the angular position and/or the rotation rate of the idler wheel can be determined by means of the transmission ratio of the shift stage of this idler wheel on the basis of the angular position and/or the rotation rate of the driven gear meshing with this idler wheel. The angular position and/or the rotation rate of this driven gear results from the angular position and/or the rotation rate of the driven shaft, which, in turn, is determined by the transmission ratio of the engaged gear. In this way, it is possible to determine the angular position and/or the rotation rate of each input side and each output side of each clutch of the bicycle gearbox.

The actuation signal, in particular the control parameters, may here be dependent on the rotation rate and/or the angular position of the input and output sides of the clutches to be actuated, in particular the difference existing between the input side and the output side of a clutch as regards the rotation rate and/or the angular positions. The time within which the clutches can be fully engaged results from this difference.

The data processing device may have stored therein a switching time within which a clutch to be actuated can be actuated, i.e. engaged. This switching time may, for example, correspond to the time required for extending a freewheel pawl or for axially moving a claw clutch until it engages with the clutch teeth. This time may depend on switching parameters, such as the temperature of the bicycle gearbox, or on the torque transmitted through the bicycle gearbox, or possibly on the current gear stage and the gear to be engaged. In a transfer function stored in the data processing device, these dependencies of the switching time can be stored and a switching time can be assigned to the current switching parameters. In such an embodiment, the data processing device is configured to calculate the switching time depending on at least one switching parameter.

In one embodiment of the present invention, the data processing device may have stored therein, for each possible gear change, a time difference, by which the one respective clutch actuator to be actuated must be actuated earlier or later in relation to the other clutch actuator to be switched.

BRIEF DESCRIPTION OF THE DRAWINGS

In the following, the present invention will be described exemplarily on the basis of example embodiments with reference to the accompanying drawings. In accordance with the above explanations, a feature of an example embodiment following hereinafter may be omitted, if, in a particular case of use, the technical effect associated with the feature in question is not important. Conversely, an example embodiment following hereinafter may have added thereto an above-described feature, if, in a particular case of use, the technical effect associated with this feature is important.

In the following, for the sake of simplicity, the same reference numerals are used for features that correspond to one another in terms of function and/or structure.

The Figures show:

Figure 1:
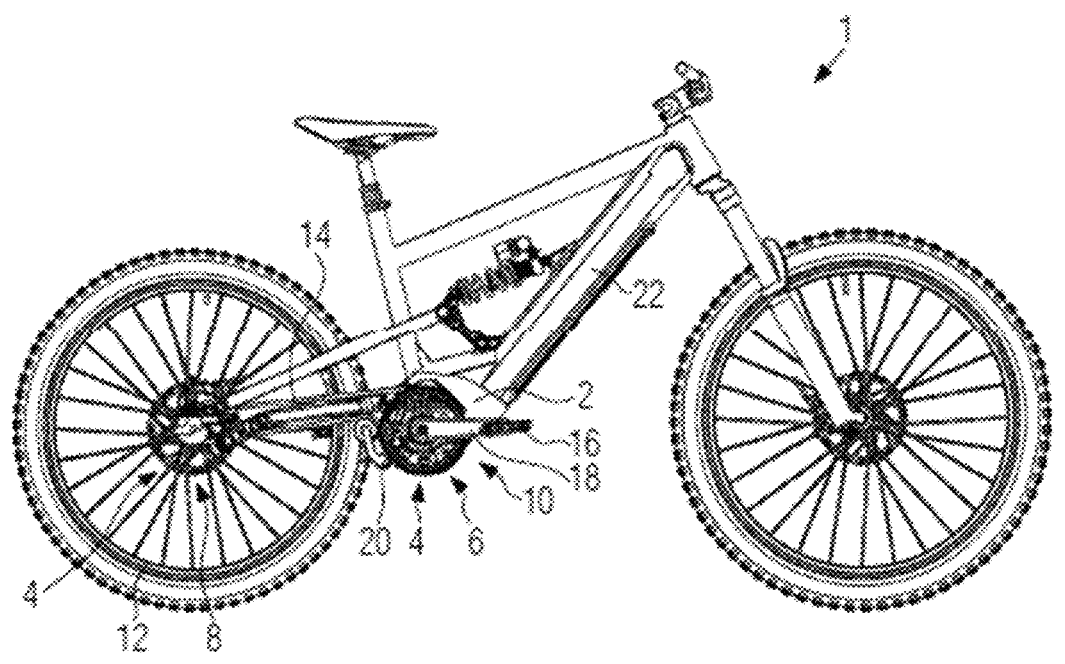
Figure 2:
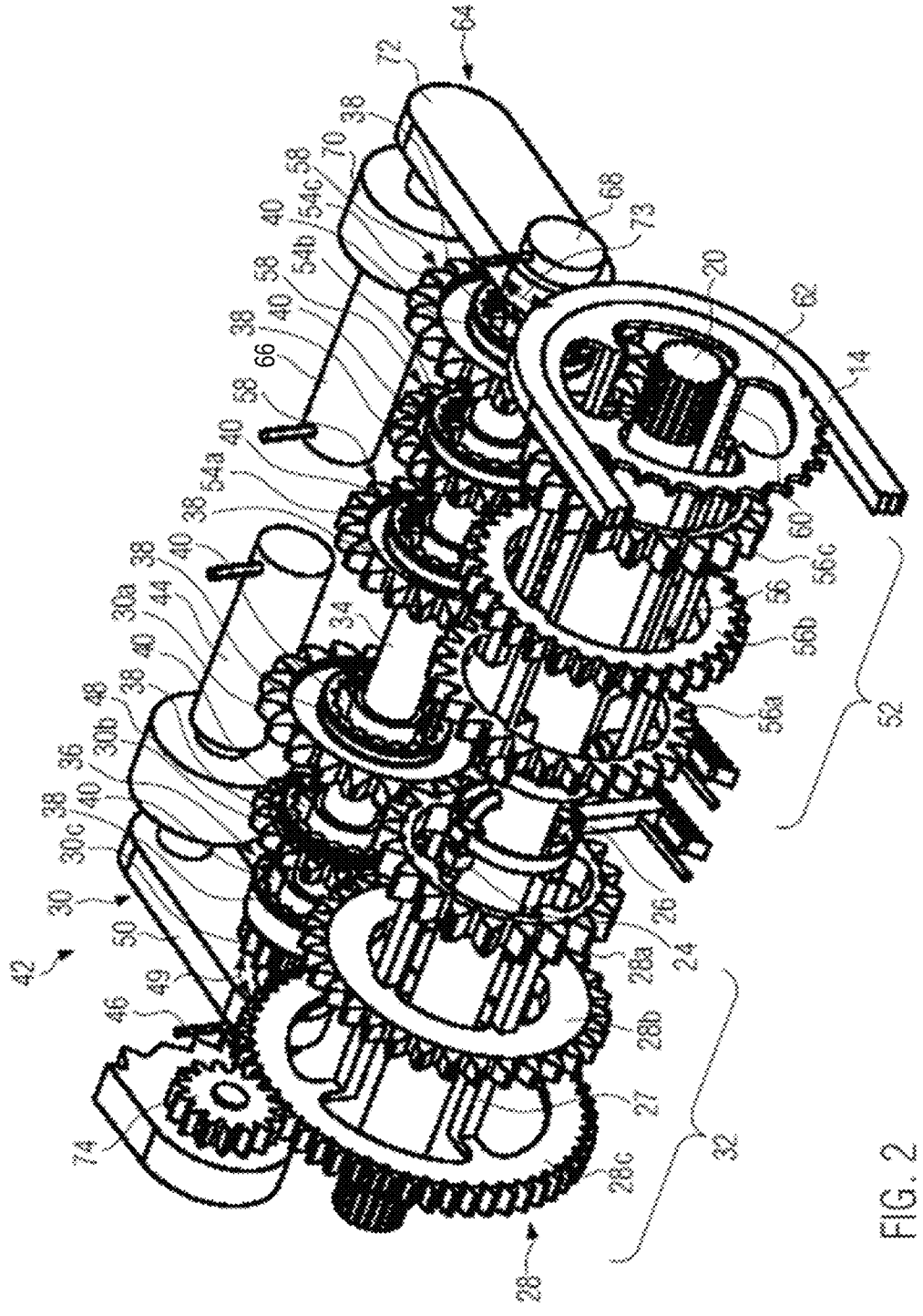
Figure 3:
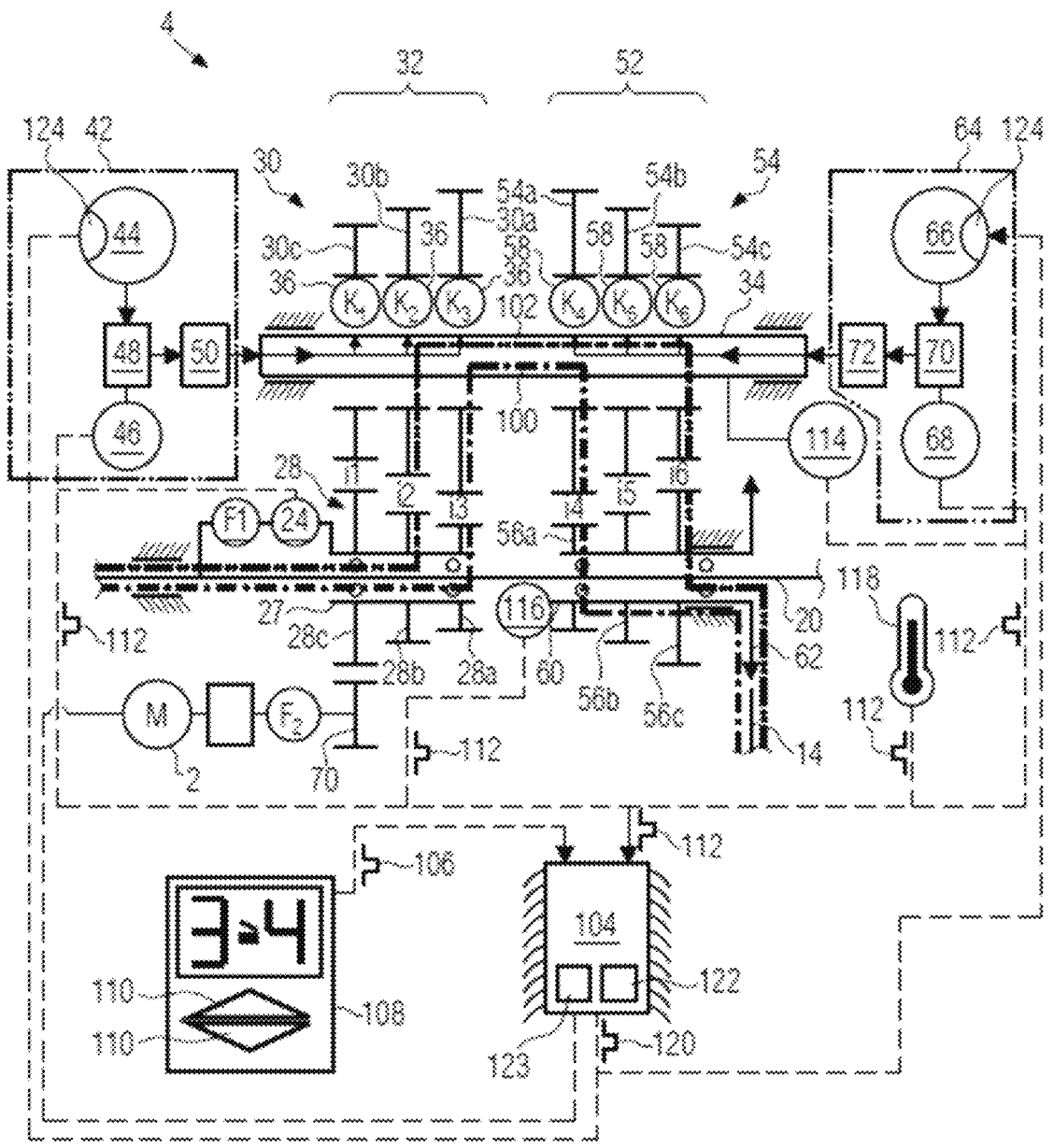
Figure 4:
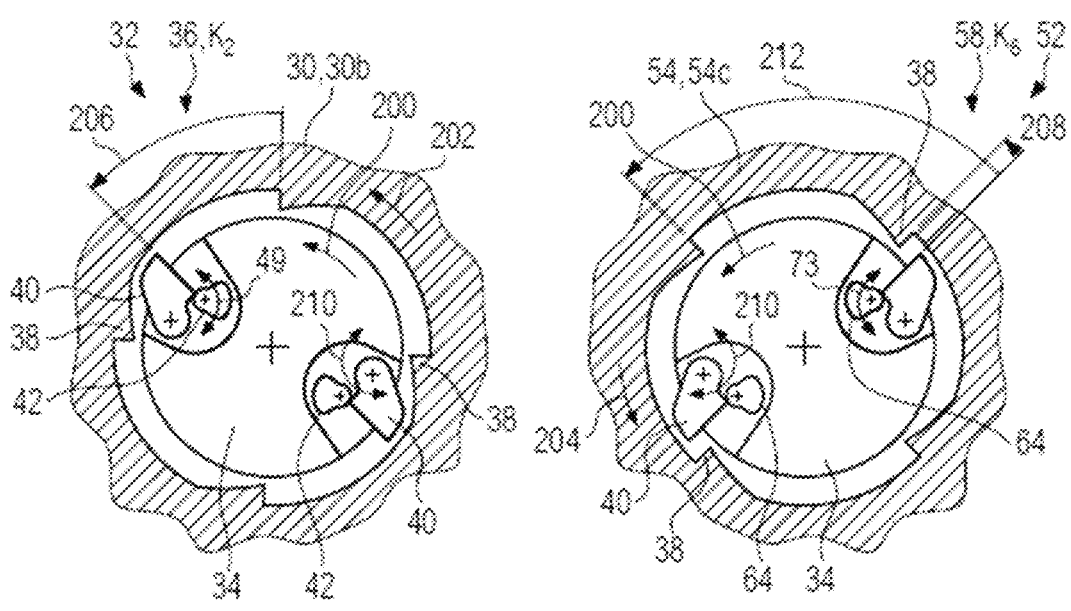
Figure 5:
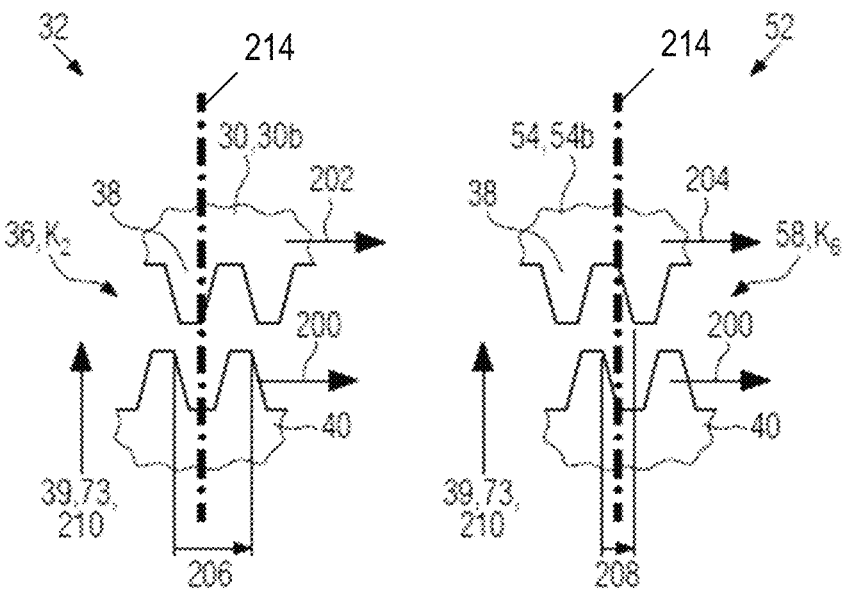
Figure 6:
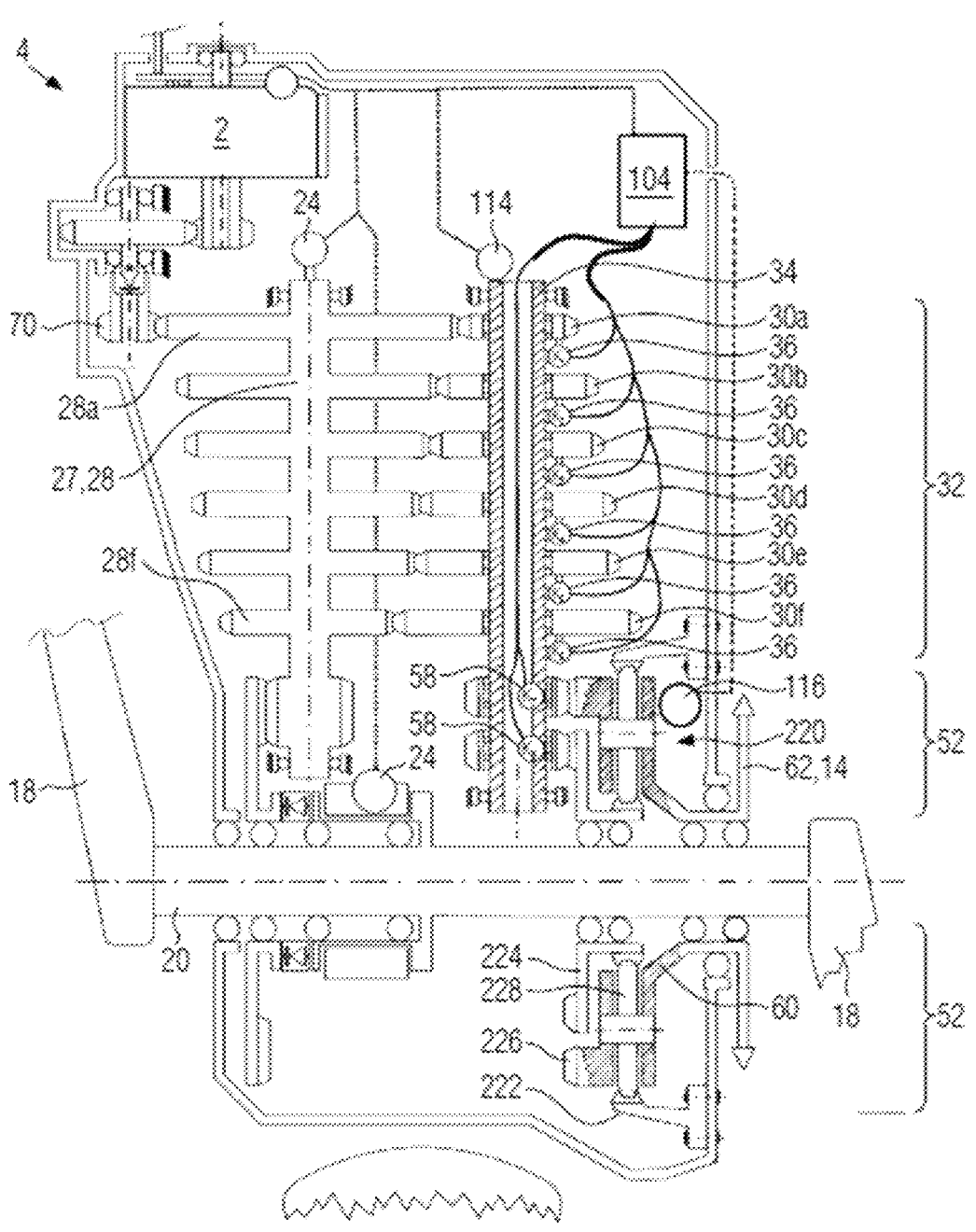
Figure 7:
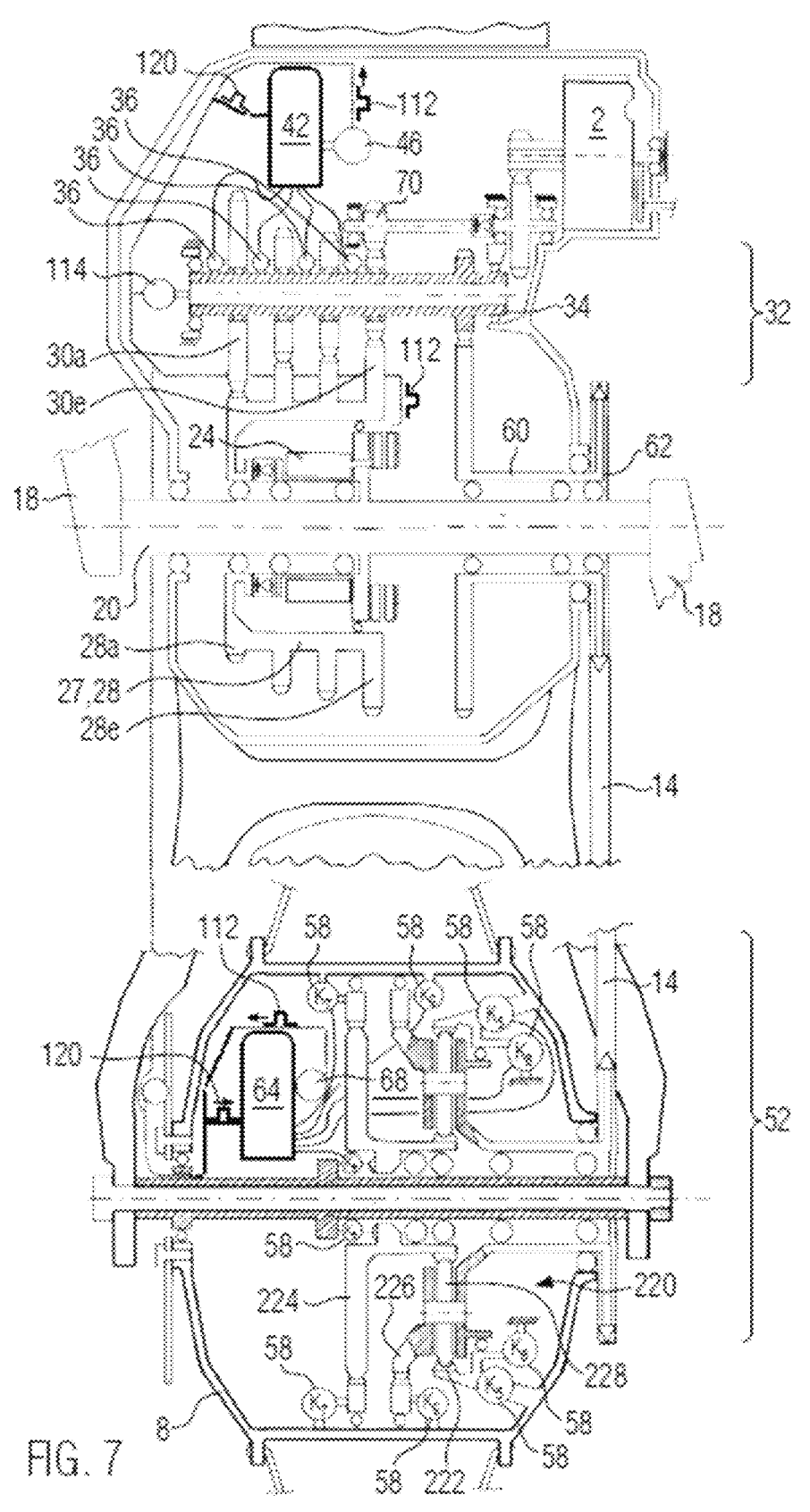
Figure 8:
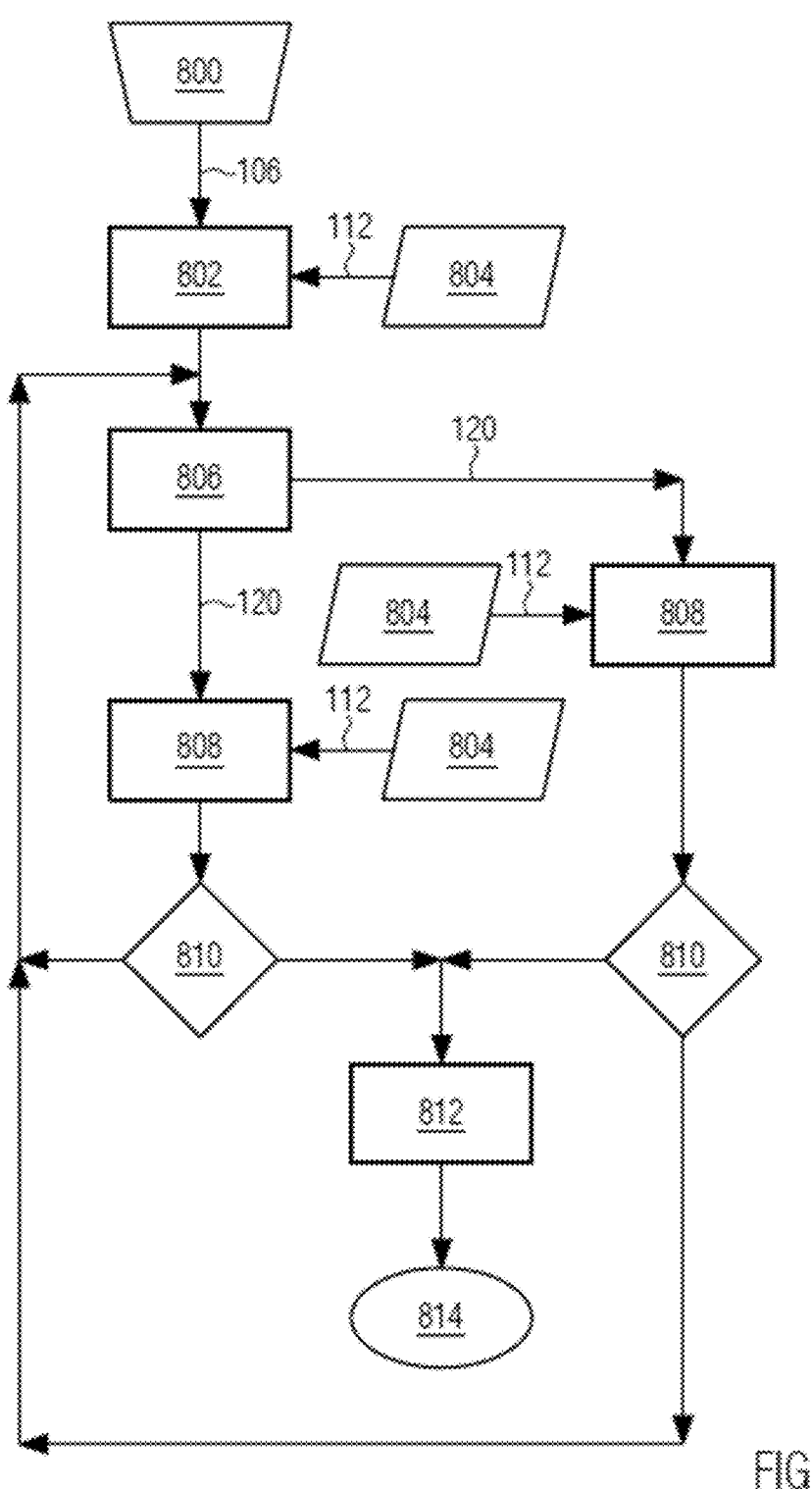
Figure 9:
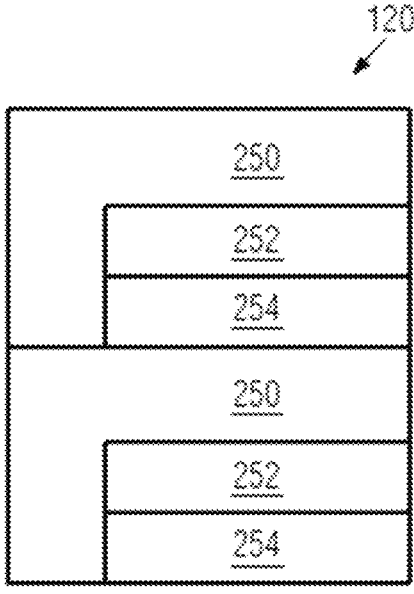

FIG. 1 a schematic representation of a bicycle with a bicycle gearbox and with or without an auxiliary motor;

FIG. 2 a schematic perspective representation of a bicycle gearbox;

FIG. 3 a schematic representation of a bicycle gearbox;

FIG. 4 a schematic representation of a switchable freewheel;

FIG. 5 a schematic representation of a switchable freewheel;

FIG. 6 a schematic representation of a bicycle gearbox;

FIG. 7 a schematic representation of a bicycle gearbox;

FIG. 8 a schematic representation of a gear change;

FIG. 9 a schematic representation of a digital actuation signal; and

Figure 10:
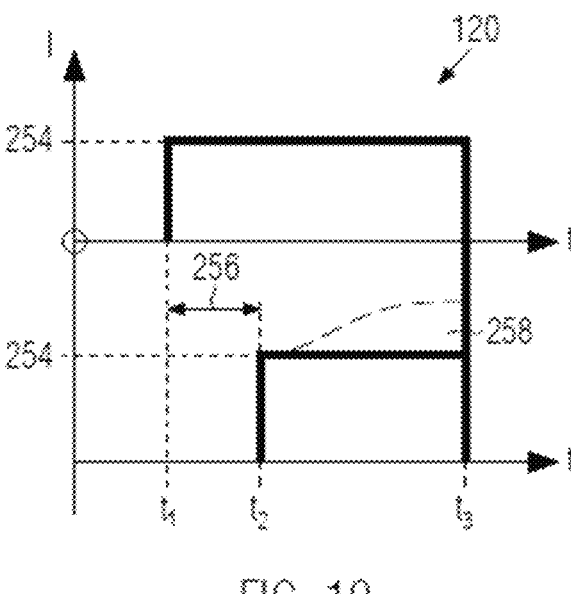

FIG. 10 a schematic representation of an analog actuation signal.

DETAILED DESCRIPTION

FIG. 1 shows a bicycle 1, which can be configured with or without an auxiliary motor 2. A bicycle gearbox 4 is located in the area of the bottom bracket 6 (bottom bracket gearshift device) or on or in the rear wheel hub 8 (hub gear). One variant may also be configured such that a bottom bracket gearshift device is combined with a hub gear, and the hub gear and the bottom bracket gearshift device can then be regarded as two partial gearboxes of a common gearbox.

The bicycle 1 may be a bicycle of any structural design for any kind of use, for example a bicycle with low step through, a bicycle with a truss frame, a trapezoidal frame, a cross frame, a mixture frame or a diamond frame, a part-suspension or full-suspension bicycle, a touring bicycle, a cargo bicycle, a mountain bike, a gravel bike, a cyclocross bicycle or a racing bicycle. The bicycle may be a single-track or a multi-track bicycle.

In all these cases, the bicycle 1 is driven by means of a pedal drive 10 and the power of the pedal drive 10, possibly increased by the auxiliary motor 2, is transmitted to the rear wheel 12. The transmission of the drive power from the pedal drive 10 to the rear wheel 12 or the rear wheel hub 8 can take place making use of a pulling means 14, for example a belt or a chain.

The pedal drive 10 has pedals 16 which are rotatably mounted on pedal cranks 18. The pedal cranks 18 with the pedals 16 are fixed to a bottom bracket shaft 20.

The bicycle 1 may have a battery 22 that can be used as an energy source, for example for the auxiliary motor 2 and/or actuators (not shown) by means of which the bicycle gearbox 4 can be shifted.

An example of a bicycle gearbox 4 is shown in FIG. 2. The bicycle gearbox 4 according to FIG. 2 is particularly suitable as a bottom bracket gearbox and can be used in combination with an auxiliary motor 2. More details on the exemplary structural design of the embodiment according to FIG. 2 can be inferred from patent application DE 102022001738.5, which is herewith referred to in its entirety. In addition to or instead of being designed in the form of a spur gearbox, as shown in FIG. 2, all the gear wheel pairings or individual gear wheel pairings may, of course, also be configured as planetary gearboxes.

The cyclist's drive power delivered to the pedals 16 (FIG. 1) is fed into to the bottom bracket shaft 20 via the pedal cranks 18 (FIG. 1). The drive power is then transferred from the bottom bracket shaft 20 to a drive shaft 27 via a sensor system 24 and a freewheel 26. The drive shaft 27 is a gear shaft of the bicycle gearbox 4. It represents the input shaft of the bicycle gearbox 4. As shown, the drive shaft may be configured as a hollow shaft, the bottom bracket shaft 20 being accommodated in the drive shaft 27 such that it is rotatable relative to the drive shaft. The drive shaft 27 may be tubular or cage-shaped. In FIG. 1, it is formed by four axially extending beams or struts.

The drive shaft 27 may be configured as a cluster gear 28 including a plurality of driving gear wheels 28a, 28b, . . . connected to one another other in a rotationally rigid manner. In the embodiment shown, three driving gear wheels 28a, 28b, 28c are exemplarily shown. The driving gear wheels 28a, 28b, . . . are preferably integrally connected to one another, so that the cluster gear forms a single part. The cluster gear 28 may, for example, be milled from the solid or assembled from individual parts.

The sensor system 24 is configured to detect the torque applied to the bottom bracket shaft, the rotation rate and/or the absolute and/or relative angular position of the bottom bracket shaft 20, and to output each as a switching parameter in signal form.

Alternatively or cumulatively, the sensor system 24 may be configured to detect the torque applied to the cluster gear 28, the rotation rate of the cluster gear 28 and/or the absolute and/or relative angular position of the cluster gear 28, and to output each as a switching parameter in signal form.

The cluster gear 28 is in mesh with a set of idler wheels 30. Each driving gear wheel of the cluster gear 28 meshes with a different idler wheel 30. It follows that, in accordance with the three driving gear wheels 28a, 28b, 28c, three idler wheels 30a, 30b and 30c are provided in the embodiment shown, the driving gear wheel 28a being constantly in mesh with the idler wheel 30a, the driving gear wheel 28b with the idler wheel 30b and the driving gear wheel 28c with the idler wheel 30c.

The cluster gear 28 and the idler wheels 30 meshing therewith form a first partial gearbox 32. The number of gears of the first partial gearbox 32 is determined by the number of driving gear wheel/idler wheel pairings. In the embodiment according to FIG. 2, three such pairings are provided, so that the first partial gearbox 32 correspondingly has three gears.

Since the idler wheels 30 are constantly in mesh with the gear wheels 28a, 28b, 28c of the cluster gear 28, the angular position of each idler wheel 30c, 30b and 30a is inevitably determined by the angular position of the cluster gear 28. Hence, the angular position of each of the idler wheels 30 can be determined on the basis of the angular position of the bottom bracket shaft 20 and/or of the cluster gear 28 detected by the sensor system 24. Likewise, the rotation rate of the idler wheels 30 can be calculated on the basis of the rotation rate of the cluster gear 28.

The idler wheels 30 are mounted such that they are rotatable independently of one another on a gear shaft 34, which is here referred to as control shaft. Each of the idler wheels 30 has associated therewith a clutch, preferably in the form of a switchable freewheel 36, which in the actuated (switched) state transmits a torque to the control shaft 34 in one direction only, and in the non-actuated (non-switched) state permits free rotation of the respective idler wheel 30a, 30b, 30c on the control shaft in any direction of rotation.

Each switchable freewheel 36 has an input side and an output side. The output side of each switchable freewheel 36 is formed by clutch teeth 38, which are connected in a rotationally rigid manner to the respective idler wheel 30, and may, by way of example, be formed directly by the idler wheel 30. The clutch teeth 38 may be configured as a spur toothing or, as shown in FIG. 1, as an internal toothing.

In FIG. 1, the switchable freewheels 36 are exemplarily configured as pawl freewheels and include one or a plurality of freewheel pawls 40, each of which can be brought into engagement with one of the grooves of the internal toothing 35. Instead of individual freewheel pawls 40, a toothed disk may be provided, for example in the form of a claw clutch. The term "freewheel pawl" is here intended to include also the teeth or the claws of a toothed disk. In the non-actuated state, the at least one freewheel pawl has been moved out of engagement with the clutch teeth 38. The freewheel pawls 40 of the clutches are connected to the control shaft 34 in a rotationally rigid manner. "Rotationally rigid" means here in particular that the freewheel pawls are able to move relative to the control shaft 34—primarily axially—as part of their freewheel function, but can transmit a torque to the control shaft 34 in one direction of rotation.

The at least one input side of the switchable freewheels 36 is defined by the at least one freewheel pawl 40.

The respective clutch teeth 38 are located on the idler wheels 30, but may also be located on the control shaft 34, i.e. on the input side of a switchable freewheel 36. In this case, the at least one freewheel pawl is located on the respective idler wheel and thus on the output side.

In the switched or actuated condition of the freewheel, the drive torque is transmitted in one direction of rotation from the idler wheel, whose freewheel is actuated, to the control shaft 34. For this purpose, the at least one freewheel pawl 40 must be engaged in the clutch teeth 38.

For switching the clutches or switchable freewheels of the idler wheels 30 of the first partial gearbox 32, a first clutch actuator 42 is provided. The clutch actuator 42 actuates the switchable freewheels 36 of the idler wheels 30 by means of an electric, magnetic and/or electromagnetic drive.

In the embodiment shown here, the first clutch actuator 42 has an actuator motor 44 and a sensor system 46. The sensor system 46 is configured to detect a position, for example an absolute or a relative angular position, a switching speed and/or a switching power of the first clutch actuator 42 and to output each as a switching parameter in signal form. The sensor system 46 may include a position sensor, for example a rotation angle sensor, a rotation rate sensor, a torque sensor and/or a current sensor. The current sensor may be configured to detect a current, a voltage and/or an electrical power of the actuator motor 44.

In the embodiment shown, the clutch actuator 42 generates a rotational switching movement 49. The switching movement 49 is used for activating the switchable freewheels. In other embodiments, the switching movement 49 may also be translational. A combination of a rotational and a translational switching movement 49 is also possible.

The sensor system 46 may in particular be configured to detect the position of the at least one freewheel pawl 40 in absolute or relative terms, in particular relative to the control shaft 34. The sensor system 46 may further be configured to detect the rotation rate of the control shaft 34, the actuation speed of the clutch actuator 42 and/or the power of the first clutch actuator 42.

In addition, the first clutch actuator 42 may also include a first actuator gearbox 48, for example a reduction gear, and/or a first superposition gear 50.

Via a mechanism, which is not shown in FIG. 1 and which may be located within the control shaft, the first clutch actuator 42 switches the switchable freewheels 36 of the first partial gearbox 32 by moving the respective freewheel pawls 40 into or out of engagement with the clutch teeth 38.

The torque is transmitted from the first partial gearbox 32 into the second partial gearbox 52 via the control shaft 34. In the bicycle gearbox 4 shown here, the second partial gearbox 52 is structurally united with the first partial gearbox 32. The control shaft 34 thus connects the first and second partial gearboxes 32, 52.

However, the first and second partial gearboxes 32, 52 need not necessarily be structurally united.

The first and second partial gearboxes 32, 52 may also be arranged spatially separated from each other. For example, the first partial gearbox 32 may be located on the bottom bracket and the second partial gearbox 52 on the rear wheel hub 8 (FIG. 1).

In the case of the exemplary embodiment of a bicycle gearbox shown in FIG. 2, the first and second partial gearboxes 32, 52 have a similar structural design. Both are spur gearboxes. In one variant, however, one partial gearbox may be a spur gearbox and another partial gearbox may be a planetary gear. In addition, both partial gearboxes may be planetary gearboxes. The gear shafts of the partial gearboxes 32, 52 may have parallel or non-parallel axes of rotation. Also the structural design of the gearbox making exclusively use of switchable freewheels is to be regarded as being merely exemplary. It is also possible to replace individual switchable freewheels by self-actuated freewheels. Furthermore, it is possible to configure individual clutches as positive-locking clutches or as frictional-engaging clutches according to the prior art.

The second partial gearbox 52 according to FIG. 1 has a plurality of output-side idler wheels 54, which are mounted on the control shaft 34 such that they are rotatable independently of one another. For example, three idler wheels 54*a*, 54*b*, 54*c* may be provided.

The idler wheels 54*a*, 54*b*, . . . of the second partial gearbox 52 are in mesh with driven gear wheels 56*a*, 56*b*, . . . . The driven gear wheels 56*a*, 56*b*, . . . are connected to one another in a rotationally rigid manner. Like the gears 28*a*, 28*b*, . . . , they can be structurally united to form a cluster gear 56. The cluster gear 56 may, for example, be formed of a single monolithic body. It may, however, also be assembled from a plurality of elements. The number of driven gear wheels 56*a*, 56*b*, . . . corresponds to the number of idler wheels 54 of the second partial gearbox 52. Each idler wheel 54 is in mesh with a different driven gear wheel 56. For example, in FIG. 1 the idler wheel 54*a* is in mesh with the driven gear wheel 56*a*, the idler wheel 54*b* is in mesh with the driven gear wheel 56*b* and the idler wheel 54*c* is in mesh with the driven gear wheel 56*c*.

Each of the output-side idler wheels 54 is provided with clutches, preferably switchable freewheels 58, as is the case with each of the input-side idler wheels 30. The switchable freewheels 58 of the output-side idler wheels 54 may be configured as described above in the context of the input-side idler wheels 30. In particular, the switchable freewheels 58 of the output-side idler wheels 56 may be configured like the switchable freewheels 36 of the input-side idler wheels 30 and may each have at least one freewheel pawl 40 and clutch teeth 38 complementary thereto. The switchable freewheels 58 transmit, in the actuated or switched state, a torque from the control shaft 34 to the respective idler wheel 56*a*, 56*b*, 56*c* in only one direction of rotation. The switchable freewheels 58 may be configured identically to the switchable freewheels 36. In view of the direction of the torque or power flow through the second partial gearbox 52, the at least one freewheel pawl 40 of a switchable freewheel 58 defines the respective input side of the clutch in question, while the clutch teeth 38 on the idler wheels represent the output side. As already described above in the context of the switchable freewheels 36, the at least one freewheel pawl of a switchable freewheel 58 may also be arranged on the output side and the clutch teeth 38 on the input side.

The drive torque is transmitted from the idler wheel 54*a*, 54*b*, 54*c*, whose clutch is actuated at the moment in question, to the driven gear wheel 56*a*, 56*b*, 56*c* that is in mesh with said idler wheel.

The drive power is transmitted from the driven gear wheels 56*a*, 56*b*, 56*c* to a driven shaft 60. The driven shaft 60 is a further gear shaft of the bicycle gearbox 4. The drive power is thus transmitted from the pedals 16 via the drive shaft 27, the control shaft 34 and the driven shaft 60 through the bicycle gearbox 4.

The driven shaft 60 may be configured as a hollow shaft in which the bottom bracket shaft 20 is rotatably accommodated. The driven shaft 60 may be an integral part of the cluster gear 56 of the second partial gearbox 52. The hollow driven shaft 60 may be tubular or cage-shaped. In the embodiment shown, the hollow driven shaft 60 is formed by four axially extending connecting struts.

The hollow driven shaft 60 transmits the torque to a front pulley 62, which then transmits the drive power via the pulling means 14, for example a belt, to the rear wheel 12 (FIG. 1). The front pulley 62 may be configured as a chain ring 62, if the pulling means 14 used is a chain.

The switchable freewheels 58 of the second partial gearbox 52 can be actuated by a second clutch actuator 64. In one embodiment, the second clutch actuator 64 may have the same structural design as the clutch actuator 42 of the first partial gearbox 32. The second clutch actuator 64 may thus include a second actuator motor 66 and a sensor system 68.

The sensor system 68 preferably has the same structural design as the sensor system 46. The sensor system 68 is, by way of example, configured to detect a position, for example an absolute or a relative angular position, a switching speed and/or a switching power of the second clutch actuator 64 and to output them in signal form. The sensor system 68 may include a position sensor, such as a rotation angle sensor, a rotation rate sensor, a torque sensor and/or a current sensor. The sensor system 68 may in particular be configured to detect the position of the freewheel pawls 40 in absolute or relative terms, in particular relative to the control shaft.

The sensor system 68 may further be configured to detect the rotation rate of the control shaft 34, the actuation speed of the second clutch actuator 64 and/or the power of the second clutch actuator 64. The sensor system 68 of the second clutch actuator may also include a current sensor that is configured to detect a current, a voltage and/or an electrical power, with which the second clutch actuator 64 is actuated, and to output each as a switching parameter in signal form.

The second clutch actuator 64 may further include a second actuator gearbox 70 and a second superposition gear 72.

According to an advantageous structural design, which is independent of the rest of the structural design of the bicycle gearbox, the first actuator motor 44 and the second actuator motor 66 are not located next to the control shaft 34 in the direction of travel.

The second clutch actuator 64 generates a switching movement 73, which is also in this case only by way of example a rotational movement. Like the switching movement 49 of the first clutch actuator 42, the switching movement 73 may be translational or rotational-translational. The switching movement 73 of the second clutch actuator 64 activates the switchable freewheels 58 actuated by it.

If an auxiliary motor 2 (FIG. 1) is provided, its power can be introduced into the first partial gearbox 32, in this case the control shaft 34, via an auxiliary-motor driving gear wheel 74.

The battery 22 (FIG. 1) can be used to supply the clutch actuators 42, 64 with energy, also in cases where the bicycle 1 is not provided with an auxiliary motor 2.

FIG. 3 shows schematically a further bicycle gearbox 4 having a structural design very similar to that of the bicycle gearbox 4 according to FIG. 2.

The bicycle gearbox 4 has three shift stages in each of the two partial gearboxes 32, 52. The shift stages of the first partial gearbox 32 are referred to as i1, i2 and i3 with increasing reduction ratios. The shift stages of the second partial gearbox 52 are designated as i4, i5 and i6 with increasing reduction ratios. It goes without saying that each partial gearbox may also have a different number of shift stages. For example, instead of the 3×3 combination shown here, also a 2×4, a 3×6 or any other combination may be used. The following description does not change qualitatively, if the number of shift stages in one of the partial gearboxes 32, 52 is changed.

Each of the shift stages i1 to i6 is provided with a respective clutch K1 to K6, which is assigned to an idler wheel 30*a* to 30*c*, 54*a* to 54*c* and is arranged on these idler wheels, respectively. For example, the idler wheel 30*c* of gear stage i1 is connected via the shiftable clutch K1 to the control shaft 34 in a torque-transmitting manner. The idler wheel 30*b* of shift stage i2 is connected via the clutch K2 to the control shaft 34 in a torque-transmitting manner, while the idler wheel 30*a* of shift stage i3 is connected via the shiftable clutch K3 to the control shaft 34 in a torque-transmitting manner.

This is also the case with the second partial gearbox 52: the output-side idler wheel 54*a* of shift stage i4 is connected via the shiftable clutch K4 to the control shaft 34 in a torque-transmitting manner. The output-side idler wheel 54*b* of shift stage i5 is connected via the shiftable clutch K5 and the output-side idler wheel 54*c* of shift stage i6 is connected via the clutch K6 to the control shaft 34 in a torque-transmitting manner.

Each of the clutches K1, . . . , K6 may be configured as a switchable freewheel 36, 58 of the type described above in FIG. 2. The three shift stages i1 to i3 of the first partial gearbox and the three shift stages i4 to i6 of the second partial gearbox 52 provide a total of nine gears. F1 and F2 denote non-switchable freewheels, which may be arranged between the sensor system 24 and the bottom bracket shaft 20 (F1) and the motor 2 and the bottom bracket shaft 20 (F2).

The transmission ratios of the shift stages i1, . . . , i6 are preferably chosen such that, during upshifting, one shift stage of one partial gearbox remains constantly shifted and all shift stages of the other partial gearbox are shifted through one after the other. Once all the shift stages of the other partial gearbox have been shifted through, shifting to the next shift stage of the one partial gearbox and, simultaneously, shifting back to the initial shift stage of the other shift stage are carried out until all shift stages have been shifted through. During downshifting, this is reversed accordingly.

For example, the first gear, the gear with the lowest transmission ratio, can be engaged when, in FIG. 3, the torque flow is routed through the shift stages i3 and i6, i.e. when the clutches K3 and K6 have been actuated. During sequential upshifting, when shift stage i3 has been shifted, upshifting is first carried out from shift stage i6 to shift stage i5 into the second gear and then from shift stage i5 to shift stage i4 into the third gear.

Upshifting from shift stage i6 to shift stage i5 is carried out by actuating the clutch K5 and, simultaneously or subsequently, deactivating the clutch K6. Due to the fact that these clutches are configured as switchable freewheels 36, both clutches K5 and K6 can remain actuated for a short period of time, since the freewheel will spin in the case of clutch K6. A state in which both clutches K5 and K6 are deactivated or disengaged at the same time should, however, be avoided, since the cyclist would then pedal without experiencing resistance, and this may lead to injuries.

For shifting up from second to third gear, clutch K4 is actuated and clutch K5 is disengaged. Also in this case, both clutches K4 and K5 could, due to the freewheel, actually remain engaged. Clutch K5 is only disengaged in order to avoid energy losses and noise.

When a partial gearbox has been shifted through, i.e. in the present example the shift stage i4 of the second partial gearbox 52 has been reached, the next shift stage of the other—in this case the first—partial gearbox must be shifted during further upshifting, and, at the same time, the other partial gearbox must be shifted back to the lowest transmission ratio. When shifting from e.g. the third gear 100, in which the torque flow runs through the shift stages i3 and i4, to the fourth gear 102, the torque flow must be routed through shift stages i2 and i6. This means that two clutches, viz. the clutches K2 and K6, must be actuated simultaneously during this shifting process. Furthermore, the clutches K3 and K4 must be disengaged, when the clutches K2 and K6 have been engaged.

If, during such a gear change, the two clutches to be actuated do not engage at exactly the same time, undesirable intermediate gears may be engaged for a short time. For example, during the gear change described above, the clutches K2 and K6 should ideally be engaged at the same time. If the clutch K2 engages before the clutch K6, the sixth gear will temporarily be engaged before the fourth gear is engaged when the clutch K6 is actuated. If the clutch K4 is released before the clutch K6 is actuated, the cyclist will pedal without experiencing resistance.

However, simultaneous actuation of two clutches, in particular of two different partial gearboxes, is not only necessary for sequential upshifting, but also for a direct gear change with skipping of intermediate gears. If, for example, a sudden steep incline requires shifting from a very high to a very low gear, it will also be necessary to directly shift two clutches of the two partial gearboxes. In the eighth gear, for example, the torque flow is routed through the shift stages i1 and i5, the clutches K1 and K5 are engaged and the remaining clutches are disengaged. If direct shifting to the fourth gear is now intended, the clutches K2 and K6 must be activated simultaneously in order to avoid idling and intermediate gears.

In the case of the embodiment according to FIG. 3, precise synchronization is made possible by a data processing device 104 that controls the clutch actuators 42, 64. The data processing device 104 is configured to receive a gear change signal 106, which comprises a command triggered by a cyclist to perform a gear change directly from an (engaged) gear to another gear (to be engaged).

The data processing device 104 may include one or more electronic components, for example a memory, a wired and/or a wireless input interface, a wired and/or a wireless output interface, a computer chip and/or an ASIC.

For generating the gear change signal 106, a control device 108 may be provided, in which the data processing device 104 may be structurally integrated. The control device 108 may have at least one actuating element 110 accessible to the cyclist, which may be configured as a button or a widget. Actuation of the actuating element 110 triggers the generation of the gear change signal 106. The gear change signal 106 can represent an upshift or a downshift from one gear to the other gear. As has already been mentioned above, the one gear and the other gear need not follow each other directly, but it is also possible to jump directly from one gear to any other gear, which will then appropriately be represented or coded in the gear change signal 106.

The gear change signal 106 may contain at least one gear change parameter. One gear change parameter may represent the one, engaged, gear, and another gear change parameter may represent the other gear, which is the gear to be engaged. Based on the gear change parameters, the data processing device 104 can identify the clutches 36, 58 to be engaged and the clutches 36, 58 to be disengaged as well as the switching direction.

The gear change parameter may also be designed as an incremental signal indicating the number of gears to be shifted up or down.

The data processing device 104 is further configured to receive at least one switching parameter 112 that is representative of a state of the bicycle gearbox 4. The switching parameter 112 allows to control the clutch actuators 42, 64 such that, when changing from one gear directly to the other, the two clutches to be actuated are switched at exactly the same time and transmit the drive torque. The switching parameter 112 represents status variables that influence the gear change, in particular the behavior of the clutches and the switchable freewheels, respectively.

For generating the switching parameter 112, the bicycle gearbox 4 has a number of sensor systems, which can be regarded as part of the control device 108. As has already been explained above, the sensor systems output the respective measured variables detected by them as switching parameters 112 in signal form.

FIG. 2 shows, as an example, a sensor system 24 on the bottom bracket shaft 20, a sensor system 46 of the first clutch actuator 42 and a sensor system 68 of the second clutch actuator 64.

The sensor system 24 provides at least one switching parameter 112 from the following group of switching parameters: the (angular) position of the bottom bracket shaft 20, the rotation rate of the bottom bracket shaft 20, the torque acting on the bottom bracket shaft 20.

Since the gear wheels 28*a*, 28*b*, . . . are connected to the bottom bracket shaft in a rotationally rigid manner and are in mesh with the idler wheels 30*a*, 30*b*, . . . , the position, the rotation rate and the torque of the respective gear wheels 28*a*, 28*b* and of the respective idler wheels 30*a*, 30*b* can be calculated from the position, the rotation rate and/or the torque at the bottom bracket shaft.

The sensor system 46 of the first clutch actuator 42 provides at least one switching parameter 112 from the following group of switching parameters: the position of the first clutch actuator, the switching speed of the first clutch actuator, the electrical power supplied to the first clutch actuator. The position and the switching speed of the first clutch actuator can be used for determining the position and the speed of movement of the freewheel pawls 40 (FIG. 1), which are driven by the first clutch actuator 42, along their engagement movement (cf. FIGS. 4 and 5). The engagement movement of the at least one freewheel pawl 40 is generated by a switching movement 49 of the clutch actuator 42 driving this freewheel pawl; mechanical means for motion transmission, such as levers, cams, slide guides, eccentrics, etc., can be arranged between the actuator motor and the at least one freewheel pawl and can be part of the clutch actuator.

Also the electrical power supplied to the first clutch actuator 42 can be used for calculating the speed of movement of the freewheel pawls 40 of the first partial gearbox 32, which are driven by the first clutch actuator 42. The device configured for making these calculations is preferably the data processing device 104.

The sensor system 68 of the second clutch actuator 64 is preferably configured in the same way as the sensor system 46 of the first clutch actuator 42. The sensor system 68 of the second clutch actuator 64 provides at least one switching parameter 112 from the following group of switching parameters: the position of the second clutch actuator, the switching speed of the second clutch actuator, the electrical power supplied to the second clutch actuator. The position and the switching speed of the first clutch actuator can be used for determining the position and the speed of movement of the freewheel pawls 40 driven by the second clutch actuator 64. The electrical power supplied to the second clutch actuator 64 can also be used for calculating the speed of movement of the freewheel pawls 40 of the second partial gearbox 52, which are driven by the second clutch actuator 64. The device configured for making these calculations is preferably the data processing device 104.

The control shaft 34 may have provided thereon a sensor system 114. The sensor system 114 may include a position sensor, for example a rotation angle sensor, which detects the angular position of the control shaft 34 as a switching parameter. As with all other sensor systems, the temporal sequence of the detected positions can be used for calculating, by temporal derivation, a speed, in the case of a rotation angle sensor e.g. the rotation rate—or equivalently—the speed. Alternatively or cumulatively, the sensor system 114 may also include a rotation rate sensor that measures the rotation rate of the control shaft 34 and outputs it as a switching parameter 112. Alternatively or cumulatively, the sensor system 114 of the control shaft may include a torque sensor, so that the torque applied to the control shaft 34 can be measured and output as a switching parameter 112.

The driven shaft 60 may have arranged thereon a sensor system 116, which measures the angular position, the rotation rate and/or the torque applied to the driven shaft 60 and outputs each as a switching parameter 112. For this purpose, the sensor system 116 may include a position sensor, a rotation rate sensor and/or a torque sensor.

A further sensor system 118 may be configured to detect the temperature of the gearbox and output it as a switching parameter 112.

The data processing device 104 is configured to generate an actuation signal 120, depending on the at least one switching parameter 112 and the gear change signal 106.

The actuation signal 120 is transmitted to the first and second clutch actuators 42, 64, where it triggers the actuation of the latter.

The actuation signal 120 contains control data representative of a time interval between an actuation of the first clutch actuator and the actuation of the second clutch actuator and/or a switching speed of the first clutch actuator 44 and a switching speed of the second clutch actuator 64.

The control data contained in the actuation signal are intended to ensure that the clutches 36 to be actuated for a gear change will be activated at the same time. The control data may also contain an identifier that is representative of the clutch actuator to be actuated.

If each clutch K1 to K6 is driven individually by a separate clutch actuator, the control data representative of the clutch actuators to be actuated may represent an address of the respective clutch actuator to be actuated.

The data processing device 104 can be used to implement a feedback control of the gear change. Hence, during a gear change, the actuation signal 120 can be changed depending on the current switching parameters 112. To this end, the data processing device 104 may include a routine 122 for controlling the force, position and/or speed of the clutch actuators 42, 64.

The data processing device 104 may additionally have a transfer function 123 which, for example, represents experimentally determined dependencies of the control data on the at least one switching parameter 112 and assigns an actuation signal 120 and control data, respectively, to a switching parameter 112 or a set of switching parameters 112.

A clutch actuator 42, 64 may be provided with an embedded system 124, for example a microprocessor, which controls the respective clutch actuator 42, 64. If a plurality of embedded systems 124 is provided, these systems are connected in a data-transmitting manner. Each embedded system 124 is configured to control the actuator motor 44 depending on the actuation signal 120 and the control data contained therein.

An embedded system 124 may be structurally integrated into the respective clutch actuator 42, 64 or may be a separate component, in particular also a structurally separate component.

The at least one embedded system 124 may be considered to be part of the control device 108, i.e. the signaling side of the bicycle gearbox 4. In one embodiment, the data processing device 104 may be formed by one or a plurality of embedded systems. For example, all embedded systems together can be regarded as the data processing device 104, which thus no longer has a central instance, but is designed as a fully distributed system.

In the following, it is explained on the basis of FIGS. 4 and 5 how the shift parameters 112 and the control data of the actuation signal 120 are used to achieve a synchronization of the clutch actuators to be actuated and a simultaneous actuation of the clutch actuators to be actuated for the gear change.

FIG. 4 shows schematically the positions of the idler wheels 30 (left in FIG. 4), 58 (right in FIG. 4) relative to the control shaft 34 at the time of a gear change signal 106 by the data processing device 104. The gear change requested by the gear change signal 106 requires here, by way of example, the simultaneous shifting of a switchable freewheel 36 of the first partial gearbox and of a switchable freewheel 58 of the second partial gearbox 52, i.e. in FIG. 2 of the clutches K2 and K6. It goes without saying that, depending on the requested gear change, also any other combination of the clutches K1 to K3 and K4 to K6 of the respective partial gearbox 32, 52 can take part.

The control shaft 34 rotates at a rotation speed or rotation rate 200 (the terms rotation rate and rotation speed are used as synonyms in this text), which is determined by the currently engaged gear of the first partial gearbox 32. The rotation speed 200 is therefore determined by the rotation speed or rotation rate of the bottom bracket shaft 20 (FIGS. 2, 3) and the transmission ratio i1, i2 or i3 of the currently engaged shift stage of the first partial gearbox 32, via which the drive torque is transmitted. The idler wheel 30 to be engaged rotates freely on the control shaft 34 because the clutch assigned thereto is not actuated. The rotation rate 202 of the idler wheel 30 to be engaged is therefore determined by the rotation rate of the bottom bracket shaft 20 and the transmission ratio, here e.g. i2, of the gear wheel pairing of the idler wheel 30 to be engaged and the gear wheel 28 meshing therewith, here the gear wheel pairing 30b, 28b. Hence, the control shaft 34 has a rotation rate or rotation speed 200 that differs from the rotation rate or rotation speed 202 of the idler wheel 30, which is to be engaged, of the first partial gearbox.

Within the first partial gearbox 32, during upshifting to a higher gear, the control shaft 34 has abruptly imparted thereto a higher rotation rate by the faster rotating idler wheel to be engaged. Within the first partial gearbox 32, during downshifting to a lower gear, the control shaft 34 has abruptly imparted thereto the lower rotation rate of the activated idler wheel by the deactivated clutch of the higher gear. Within the second partial gearbox 52, the clutches K4 to K6 have no influence on the rotation rate of the control shaft 34, but only on the rotation rate of the idler wheels 54a, 54b and 54c.

In FIG. 4, the situation in question is shown on the right for the second partial gearbox 52, in which the clutch K6 must be engaged for the gear change, so that the torque flow is to take place via the gear wheel pairing i6, i.e. the gear wheel pairing 54c, 56c, after the gear change.

Since the control shaft 34 is continuous in the embodiment described here, it has the same rotation rate or rotation speed 200 in the second partial gearbox 52 as in the first partial gearbox. However, the rotation speed 204 of the idler wheel 54 of the second partial gearbox 52, which is to be engaged for the gear change, differs from the rotation rate or rotation speed 202. The rotation rate 204 of the idler wheel 54, which is to be engaged, of the second partial gearbox 52 is determined by the rotation rate of the driven shaft 60 and the transmission ratio of the gear wheel pairing between the engaged idler wheel 54 and the meshing driven gear wheel 56 of the currently engaged gear.

The rotation rate and the angular position of the control shaft 34 can be determined by the data processing device 104 on the basis of the switching parameters 112 generated by the sensor system 114. The position of the clutch teeth 38 can be determined on the basis of the switching parameters 112 generated by the sensor systems 24, 116.

If the control shaft 34 is divided, the control shaft of the first partial gearbox 32 may have a rotation rate and an angular position different from that of the control shaft of the second partial gearbox 52. However, this does not change the principle explained on the basis of FIG. 4 as long as the rotation rate and the angular position of the two control shafts can be measured and/or calculated.

Taking all this into account, the switching parameters 112 can be used for calculating the current position of the control shaft 34 and thus of the at least one freewheel pawl 40 relative to the clutch teeth 38 for all the idler wheels 30, 54.

As can be seen from the comparison of FIG. 4 left and FIG. 4 right, it is not only such that the rotation rates 202 and 204 and thus the relative rotation speeds between the control shaft 34 and the idler wheels 30, 54 are different for all the idler wheels 30, 54, but the current position of the freewheel pawls 40 relative to the clutch teeth 38 is also different for each idler wheel 30, 58. This means that the two clutches 36, 58, which should actually be actuated simultaneously during a gear change, would engage at different times, if the freewheel pawls of the two clutches had exactly the same response behavior, i.e. if they were moved from the radially fully retracted to the radially fully extended condition within the same period of time.

In the first partial gearbox 32, the at least one freewheel pawl 40 of the clutch K2 assigned to the idler wheel 30b to be engaged covers an engagement distance 206, starting from its position at the point in time the data processing device 104 receives the gear change signal 106, until it is fully extended and fully meshed, i.e. engaged, with the next tooth of the clutch teeth 38. The engagement distance 206 is covered in the coordinate system of the control shaft 34 at the differential speed between the rotation speed 200 and the rotation speed 202 and thus determines the time within which the clutch K2 can be fully engaged. This time can be calculated by the data processing device 104 on the basis of the switching parameters 112. The rotation rates or rotation speeds can also be calculated by the data processing device 104 by means of temporal derivation of the angular position.

The situation with the second gearbox 52 is analogous. Here, the at least one freewheel pawl 40 of the clutch K6 to be switched, which is assigned to the idler wheel 54c, must cover an engagement distance 208 until it is fully extended and engaged and is able to transmit the drive power from the control shaft 34 to the idler wheel 54c. The time within which the engagement distance 208 is covered by the at least one freewheel pawl 40 is calculated from the difference between the rotation rates 200 and 204. Also this time can be calculated by the data processing device 104 on the basis of the switching parameters 112. All these measurement data can be received as switching parameters 112 by the data processing device 104. The rotation rates or rotation speeds can also be calculated by the data processing device 104 by means of temporal derivation of the angular position.

In the time corresponding to the engagement distances 206, 208, the clutch actuator 42, 64 must fully extend the respective at least one freewheel pawl 40 of the two clutches K2, K6 to be actuated, i.e. bring it into complete overlap with the clutch teeth 38. The freewheel pawls 40 must therefore perform a complete engagement movement 210 within this time so that they can come as completely as possible into mesh with the clutch teeth 38. The engagement movement 210 of the freewheel pawl is generated and determined by the switching movement 49, 73 of the respective clutch actuator 42, 64. The respective clutch actuator 42, 64 may include interposed mechanical elements, such as cams (shown in FIG. 4), slide guides or levers, which transmit the switching movement 49, 73 to the at least one freewheel pawl 40.

The time required to fully extend the shift pawl corresponds to a switching time. The switching time may depend on the temperature of the bicycle gearbox and/or the torque routed through the gearbox as well as on manufacturing tolerances. It can be calculated by the data processing device 104 depending on the current shifting parameters.

In FIG. 4, for example, in the situation shown on the right, the time available for executing the engagement movement 210 does, due to the short engagement distance 208, not suffice to actually bring the freewheel pawl 40 into engagement with the next tooth of the clutch teeth 38, nor does it suffice to accomplish complete engagement. Due to the short engagement distance 208, the freewheel pawl 40 could, for example, only extend incompletely and enter into engagement with the clutch teeth 38 in the incompletely extended condition. Complete clutch engagement would only be possible with the next but one tooth of the clutch teeth 38 after the distance 212 has been covered.

The memory of the data processing device 104 may have stored therein the switching time, i.e. the period of time required to fully execute the switching movement 49, 73 and the engagement movement 210, respectively. The switching times can be stored individually for each clutch actuator 42, 64 or for each clutch 30, 58. Alternatively, a single switching time can also be stored for all clutch actuators. The switching time can easily be determined by calibration.

The data processing device 104 can use the stored time period for calculating whether, with due regard to the rotation rates 200 and 204, a complete extension of the freewheel pawl 40 will be possible within the engagement distance 206, 208 to the tooth which is the next tooth of the clutch teeth 38 when the gear change signal 106 is received. If, for example, the time available is shorter than the switching time for the respective clutch actuator or the respective clutch, in FIG. 4 the clutch K6, the engagement movement 210 will not be executed until the next tooth of the clutch teeth 38 has moved past the freewheel pawl 40.

The data processing device 104 is configured to output the actuation signal to the other clutch actuator, which is to be actuated, in such a way that the freewheel pawl 40 of the other clutch to be actuated, in this case K2, will be actuated taking into account the there relevant engagement distance 206 and the rotation rates 200, 202, and that it will be ensured that both clutches to be actuated K2 and K6 will fully engage within a minimum time interval.

For actuating the clutch actuators 42, 64, the data processing device 104 outputs the actuation signal 120 (FIG. 1). The actuation signal 120 contains control data representative of a time interval between the actuation of the first clutch actuator 42 and the actuation of the second clutch actuator 64 and/or a switching speed of the first clutch actuator 42 and a switching speed of the clutch actuator 64.

The time interval between the actuation of the first clutch actuator 42 and the second clutch actuator 64 may, as described above, depend on the available engagement distance 206, 208, 212. For example, in the situation shown in FIG. 4, the clutch K2 should be switched before the clutch K6, since in the case of the clutch K6 it should be waited until the next tooth of the clutch teeth 38 has passed.

In order to ensure that the two clutches to be engaged are actuated at the predetermined time interval, the actuation signal may contain two components that are output at this time interval. The first component is output to the first clutch to be switched, which is the clutch K2 in FIG. 4, and the second component to the second clutch to be switched, here K6. When received by the respective clutch actuator, the two components can immediately trigger its actuation. In this embodiment, the control data representative of the time interval between the actuation of the clutch actuators are contained at the time interval between the two components of the actuation signal 120. The actuation signal may be output as a simple analog signal in this embodiment.

Alternatively, the actuation signal 120 may contain control data representing the respective absolute time point of execution of the switching movement 49, 73 by the clutch actuator to be actuated. In this case, the actuation signal may be digital and contain a different switching time point for each clutch actuator. Such a switching time point may, for example, represent the number of bus cycles, which are to elapse, of a data-transmitting connection between the data processing device 104 and the clutch actuators 42, 64.

According to an embodiment, each embedded system 124 may include its own continuously running clock. The individual clocks are preferably synchronized. The data processing device 104 may be configured to calculate for each clutch actuator, or at least for each clutch actuator taking part in a gear change, the at least one next time point in the future at which this actuator must switch the clutch to be actuated and/or at which the clutch to be actuated by the clutch actuator must be engaged, so that the bicycle gearbox will switch the shift stages simultaneously and with minimum idling. This at least one time point may, constantly updated as a control parameter by the data processing device 104, also be placed as information on a bus for all clutch actuators and received by the embedded systems of the clutch actuators. In this way, each of the embedded systems will immediately be ready for any gear change. This course of action is faster than calculating the relevant time points only after the manual or automatic generation of the gear change signal.

Alternatively or cumulatively, the speed of the switching movement 49, 73 can be changed by controlling the electrical power supplied to a clutch actuator 42, 64. If less time is available for complete engagement of a freewheel pawl 40 of an idler wheel to be switched into the power flow during the gear change than for the switching movement 49, 73 of the other idler wheel to be switched into the power flow, the electrical power supplied to the one clutch actuator actuating the freewheel pawl of the one idler wheel can be increased compared to the electrical power supplied to the other clutch actuator, so that the switching speed of the one freewheel pawl will be increased. Whether the current and/or the voltage and/or the frequency is increased in order to increase the switching speed is here a question of the structural design of the clutch actuator.

In addition to the switching parameters 112 which have already been mentioned above, further switching parameters 112 can be taken into account so as to make the synchronous actuation of the clutches K1 and K2 even more precise. For example, the switching movement 49, 73 can take place more slowly at low temperatures than at high temperatures. In the case of one embodiment, the switching parameter 112 supplied by the sensor system 118 and representative of the temperature of the bicycle gearbox 4 can be taken into account by the data processing device 104 in the calculation of the switching time required for executing the switching movement. The temperature dependence of the switching movement 49, 73 can be determined experimentally. The dependency may be stored in the data processing device in the transfer function 123, for example a lookup table.

Furthermore, due to the drive power transmitted through the bicycle gearbox 4, in particular due to the resulting torque, local deformations may occur at the bottom bracket shaft 20, the control shaft 34 and/or the clutches 36, 58, which can also be compensated for. The torque applied to the control shaft 34 can, for example, be detected by the sensor system 114 as a switching parameter 112. Alternatively, the torque at the control shaft 34 can also be calculated by means of the sensor system 24 and/or the sensor system 116 by taking into account the transmission ratios i1 to i6. The influence of the drive torque on the switching process may possibly be stored in the transfer function stored in the data processing device, together with other parameters, such as the temperature and the installation position of the drive system.

Due to the pulsating torque curve of a cyclist during a pedal revolution, all power-transmitting parts experience a constantly recurring application of a load and relief of a load or strain and relaxation of the bicycle gearbox or the torque-transmitting parts of the gearbox in accordance with the torque curve. The torque curve varies from one cyclist to the next. For example, a very experienced cyclist with a "round" pedal stroke may, in spite of high pedaling power, have a lower amplitude in the torque curve than a poorly trained and less experienced cyclist. For this reason, it may be advantageous, when the data processing device is configured to determine and output, respectively, the actuation signal and the control parameters in accordance with the torque curve over a pedal revolution and, possibly, additionally in accordance with the pedaling frequency. The data processing device may be configured to calculate the torque curve from one or a plurality of current torque curves, e.g. by time averaging for respective specific pedal positions over a predetermined number of pedal revolutions. However, the torque curve may also be stored in the data processing device after having been determined once, e.g. in the transfer function 123. The data processing device can thus be configured to output the actuation signal at a predetermined pedal position.

Making use of the sensor systems 46 and 68, a closed control loop during a gear change can be implemented. In this way, the position of at least one clutch actuator 42, 64 can be monitored continuously and the time required for executing the rest of the engagement movement 210 can be calculated on the basis of switching parameters, such as the angular position of the respective idler wheel and of the control shaft and their rotation rates. The actuation signal 120 can be changed, e.g. by changing the control data representing the switching speed towards a higher switching speed.

The routine 122 can perform position control, preferably of each clutch actuator 42, 64, on the basis of the position of the clutch actuator 42, 64 represented in the switching parameters 112, e.g. by successively moving to different positions along the switching movement 49, 73 or engagement movement 210 at specific points in time within the time available for engagement. Alternatively or cumulatively, the routine 122 can perform, preferably for each clutch actuator 42, 64, a speed control in which the switching speed, i.e. the speed at which the at least one freewheel pawl moves, is controlled, for example to a speed value that causes the switching movement 49, 73 to end in the case of both clutch actuators 42, 64 at the same point in time. Finally, alternatively or cumulatively, the routine 122 can execute a force control for each clutch actuator 42, 64, i.e. control the driving force applied by each clutch actuator 42, 64 and thus the acceleration of the at least one freewheel pawl 40.

In the embodiment according to FIG. 5, the clutch teeth 38 are configured as axial teeth. The freewheel pawls 40 are here, for example, part of a toothed disk with axial teeth that are complementary to the axial clutch teeth 38. The axis of rotation about which the idler wheels 30, 54 rotate and along which the control shaft 34 (not shown) extends is identified by reference numeral 214. The engagement movement 210 takes place parallel to the axis of rotation 214.

The principles explained with reference to the embodiment according to FIG. 4 also apply to the embodiment according to FIG. 5. When a gear change takes place, the same situation arises as in FIG. 4: the engagement movement 210 must be carried out within the time in which the engagement distance 206, 208 is covered. As in the embodiment according to FIG. 4, the time available for this is determined by the difference between the rotation rates 200 and 202 or 200 and 204.

FIG. 6 shows a variant of a bicycle gearbox that is also located in the bottom bracket area of the bicycle 1 (FIG. 1). In the bicycle gearbox 4 according to FIG. 6, the drive shaft 27 and the control shaft 34 extend perpendicular to the bottom bracket shaft 20 and not parallel to the bottom bracket shaft 20 as in the embodiments according to FIGS. 2 and 3.

A further difference to the above-described embodiments is that the first partial gearbox 32 has six shift stages, which are to be shifted via the respective clutches K1 to K6. The clutches K1 to K6 are preferably configured as switchable freewheels 36. The clutches K1 to K6 can be controlled by a mechanism arranged inside or outside the control shaft 34. In the present case, a clutch actuator 42 is provided for actuating the clutches K1 to K6. Alternatively, the clutches K1 to K6 may also be controlled directly by the data processing device 104, if each clutch K1 to K6 has its own clutch actuator.

The second partial gearbox 52 of the embodiment according to FIG. 6 is configured as a planetary gearbox 220, which connects the control shaft 34 to the driven shaft 60. Only by way of example, the ring gear 222 is fixed to the housing, while the sun gear 224 and the planet carrier 226 with the planet gears 228 can be fixed in position relative to the control shaft 34 via the clutches K7 and K8.

As shown e.g. in FIG. 5, the clutches K1 to K6 may be configured to engage and disengage axially, while the clutches K7 and K8 may be configured to engage and disengage radially, as shown in FIG. 4. Of course, any other combination is possible as well.

Only by way of example, the sensor systems 46 and 68 are missing in FIG. 6, so that it will not be possible to control the gear change, unless the individual clutch actuators K1 to K8 provide switching parameters concerning the switching position within their respective switching movement 49, 73 and/or the switching speed, i.e. unless the sensor systems 46 and 68 are integrated in the clutch actuators.

In FIG. 7 it is shown that the second partial gearbox, which is here configured as a planetary gearbox 220 as well, may be installed in the rear wheel hub 8, i.e. it may be arranged spatially separated from the first partial gearbox 32.

The first partial gearbox 32 has four shift stages, which are shifted via clutches K1 to K4. Also in this case, the clutches K1 to K4 are preferably configured as switchable radial or axial freewheels 36. In the second partial gearbox, the clutches K5 to K9 are provided. The drive power from the first partial gearbox is transmitted to the planet carrier 226, which can be brought into a rotationally rigid connection with the rear wheel hub 8 via the clutch K6. The clutch K7 fixes the sun gear 224 in position with respect to the rear wheel hub 8, while the clutch K9 fixes the sun gear to the housing. The clutches K7 and K9 are switched alternatively. The clutch K5 fixes the ring gear in position relative to the rear wheel hub, while the clutch K8 connects the ring gear to the planet carrier.

The clutches K5 to K9 are, also preferably, all configured as switchable freewheels 58. In particular in a planetary gearbox with a large number of clutches, of the type shown as an example in FIG. 7, an exact synchronization of the engagement and disengagement process of the clutches taking part in a gear change is important, so that no intermediate gears will be engaged or the cyclist will pedal without experiencing resistance.

During upshifting towards higher transmission ratios, the gear to be engaged is engaged when the clutches of the gear to be engaged have been activated, i.e. clutches K2 and K6 in the present example. During downshifting, the lower gear to be engaged will not be engaged until the clutches of the previously engaged higher gear have been deactivated. The clutches that are still engaged but need to be disengaged usually have to be deactivated under load, and this normally requires a longer switching time and a higher electrical power in the relevant clutch actuator than deactivating a clutch that is not under load. For this reason, a switching parameter should be representative of the switching direction and/or the gear currently engaged and the gear to be engaged. In both cases, the clutches of the previously engaged gear will not be deactivated until the clutches of the gear to be engaged have been engaged.

FIG. 8 provides an overview of the method of allowing a gear change directly from one gear to another without engaging an intermediate gear or idling.

First, in step 800, the gear change signal 106 is generated by the cyclist, e.g. by actuating the actuating element 110. The gear change signal 106 represents the gear change to be executed. The gear change need not take place from one gear to the next higher or next lower gear, but may also skip several gears, so that it will be possible to shift up or down directly from one gear to another gear that is several gears away.

The above described sensor systems monitor the respective measured variables, for the measurement of which they are configured, and generate the switching parameters 112, which represent these measured variables, in step 804. Step 804 can take place depending on the gear change signal 106, or it can take place independently, e.g. timed and/or as a constantly running background process.

In step 802, the switching parameters are read in, received or retrieved, for example by the data processing device 104.

In step 806, the control parameters for the two clutches to be switched are calculated depending on the switching parameters 112 as described above. At least one control parameter is calculated, which is representative of a time difference between the actuation of first clutch actuators required for a gear change and the actuation of second clutch actuators required for the gear change and/or the switching speed at which the clutch actuators to be actuated are operated. The control data are part of the actuation signal that is output to the at least two clutches to be switched.

Alternatively, control parameters can be calculated, which are representative of the different points in time in the future, at which the clutch actuators required for the gear change must be set in motion. These points in time may, for example, be dependent on the pedal position. For example, it may be advantageous, if the clutches to be released are released at the dead centers of the pedal position—the pedals are then vertical. Depending on the switching direction, the point in time of the dead centers of the pedal position can determine the points in time of the actuation of the first and the at least second clutch actuator.

When the actuation signal 120 has been output, the switching parameters 112, which are representative of the state of the clutches to be actuated during the requested gear change, are received in step 804, such as the position, the received power, the switching speed of the clutch actuators and the positions of the control shaft 34 and the idler wheels 30, 58. This is done separately for each clutch actuator. In step 808, the switching parameters 112 are processed. For example, the position, rotation rate and/or power of the clutch actuators are each compared with a predetermined position, rotation rate and/or power.

Alternatively or cumulatively, a comparison of the actual time with the time that has been pre-calculated for the start of the clutch operation may be executed. The first and the second clutch actuator will be actuated when the actual time matches the pre-calculated time.

Alternatively or cumulatively, the rotation rates of the idler wheels and the at least one freewheel pawl, i.e. the rotation rates of the input side and the output side of the clutches to be actuated for the gear change, can be compared with one another.

In step 810, it is queried whether the clutches to be actuated for the gear to be engaged have been actuated, i.e. whether the clutch actuators need not be actuated any further. If this is not the case, the actuation signal is output further in step 806, or recalculated on the basis of the shift parameters just recorded and then output to the clutch actuators to be actuated.

For example, a clutch to be actuated can be considered as having been actuated or engaged, when the switching parameter 112 representative of the current position of the clutch actuator assumes a value representative of a fully covered shifting distance. Alternatively or cumulatively, a clutch to be actuated can be considered as having been actuated, when the rotation rate of its input side is equal to the rotation rate of its output side.

If it is detected in step 810 that a clutch has been actuated and thus engaged, the clutch actuators of the currently engaged gear are deactivated. This means that only the clutch actuators to be actuated for the gear to be engaged remain activated. The gear to be engaged is thus engaged and the program can end with step 814.

In the embodiment shown in FIG. 8, the gear change is feedback-controlled, i.e. it includes a control loop. In the case of a simpler control of the gear change, steps 808 and 810 can be dispensed with. In this case, step 806 or 808 is followed by step 812.

In step 812, the actuated clutches of the gear that was engaged at the time the gear change signal 106 was received are released and the gear change process is finished.

FIG. 9 shows, as an example, a digital actuation signal 120 containing control data. The control data 250 can, for example, identify the clutch actuator 42, 64 for which the subsequent control data 252, 254 are intended. The control data 252 can determine the point in time at which the respective clutch actuator 42, 64 starts the switching movement. The control data 254 can be representative of the switching speed, i.e. the speed at which the respective clutch actuator 42, 64 is to perform the switching movement 49, 73. Alternatively or cumulatively, control data can determine the point in time at which the switching movement 49, 73 must be finished. In such a case, the respective addressed clutch actuator 42, 64 may be configured to calculate the switching speed from the switching parameters itself, e.g. with the aid of the microprocessor integrated in the clutch actuator. With the aid of the control data 250 addressing the respective clutch actuator, an arbitrary number of clutch actuators can be controlled individually, e.g. via a bus system.

FIG. 10 shows, as an example, an analog actuation signal 120 for two clutch actuators. The actuation signal 120 is used here directly for power transmission. The control data 254 representative of the switching speed are predetermined by the curve of the current intensity I over the time t. The control data 256 representative of a time difference between the actuation of the two clutch actuators are represented by the different points in time t1 and t2. Also in the case of this embodiment, an arbitrary number of clutch actuators can be controlled.

The curve 258 of the actuation signal 120 on the one channel shows how the switching speed can be increased by increasing the current intensity I when the switching movement of a clutch actuator is feedback-controlled. In this way, it can e.g. be ensured that all clutch actuators are engaged at the same point in time t3.

In the case of a digital actuation signal 120 of the type shown in FIG. 9, a new actuation signal with new control data 254 is sent to the respective clutch actuator during feedback control.

REFERENCE NUMERALS 1 bicycle
2 auxiliary motor
4 bicycle gearbox
6 bottom bracket
8 rear wheel hub
10 pedal drive
12 rear wheel
14 pulling means
16 pedal
18 pedal crank
20 bottom bracket shaft
22 battery
24 sensor system
26 freewheel
27 drive shaft
28 cluster gear
28*a*, 28*b*, 28*c* driving gear wheel 30 idler wheels
30a, 30b, 30c idler wheel
32 (first) partial gearbox
34 switching shaft
36 switchable freewheel (input-side of the gearbox)
38 clutch teeth
40 freewheel pawl or freewheel tooth
42 (first) clutch actuator
44 (first) actuator motor
46 sensor system at the first clutch actuator
48 (first) actuator gearbox
49 switching movement
50 (first) superposition gear
52 (second) partial gearbox
54 idler wheels of the second partial gearbox
54a, 54b, 54c idler wheel
56 cluster gear of the second partial gearbox
56a, 56b, 56c driven gear wheel
58 switchable freewheel (output-side)
60 driven shaft
62 pulley or chain ring
64 (second) clutch actuator
66 (second) actuator motor
68 sensor system at the second clutch actuator
70 (second) actuator gearbox
72 (second) superposition gear
73 switching movement
74 auxiliary-motor driving gear wheel
100 engaged gear
102 gear to be engaged
104 data processing device
106 gear change signal
108 control device
110 actuating element
112 switching parameters
114 sensor system at the switching shaft
116 sensor system at the driven shaft
118 sensor system for temperature detection
120 actuation signal
122 routine for controlling position, speed and/or force
123 transfer function
124 embedded system
200 rotation rate/rotation speed of the control shaft
202 rotation rate/rotation speed of the idler wheel, which is to be engaged, of the first partial gearbox,
204 rotation rate/rotation speed of the idler wheel, which is to be engaged, of the second partial gearbox
206 engagement distance until clutch K2 engages
208 engagement distance until clutch K6 engages
210 engagement movement
212 distance between the freewheel tooth/the freewheel pawl and the next tooth of the clutch teeth
214 axis of rotation
220 planetary gearbox
222 ring gear
224 sun gear
226 planet carrier
228 planet gear
250, 252, 254, 256 control data
258 switching speed curve
F1, F2 non-switchable freewheels
I current intensity
i1, i2, . . . gear wheel pairings/transmission ratio
K1, K2 clutches
t time
t1, t2, t3 points in time

The invention claimed is:

1. A data processing device for controlling a gear change in a bicycle gearbox for a bicycle with or without an auxiliary motor, in particular a bottom bracket gearshift device and/or a hub gear, from one engaged gear directly into another gear to be engaged by automatic actuation of a first clutch actuator and at least a second clutch actuator, wherein the data processing device is configured:

to receive at least one switching parameter representative of a current state of the bicycle gearbox; and to output an actuation signal for actuating the first and the second clutch actuator depending on the at least one switching parameter and a gear change signal representing a command for a gear change:

wherein the actuation signal contains control data which are representative of points in time in the future at which the first clutch actuator and/or the second clutch actuator will have executed or are to execute a switching movement required for the gear change, and/or of a time interval between the actuation of the first clutch actuator and the actuation of the second clutch actuator and/or of a switching speed of the first clutch actuator and a switching speed of the second clutch actuator.

2. The data processing device according to claim 1, wherein the data processing device is configured to receive a current switching parameter before or during the gear change and to change the actuation signal depending on the at least one current switching parameter received.

3. The data processing device according to claim 2, wherein the data processing device includes a routine for controlling a force, a position and/or a speed of at least one of the clutch actuators depending on the at least one switching parameter.

4. The data processing device according to claim 1, wherein the at least one switching parameter is contained in the following group of switching parameters:

at least one switching parameter representative of a current torque applied to a gear shaft of the bicycle gearbox;

at least one switching parameter representative of a current rotation rate of a gear shaft of the bicycle gearbox;

at least one switching parameter representative of a current angular position of a gear shaft of the bicycle gearbox;

at least one switching parameter representative of a drive power transmitted through the bicycle gearbox;

a switching parameter representative of a current position of the first clutch actuator and/or the second clutch actuator;

a switching parameter representative of a switching force generated by the first clutch actuator and/or the second clutch actuator;

a switching parameter representative of a current speed of movement of the first clutch actuator and/or of the second clutch actuator;

a switching parameter representative of the engaged gear; and a switching parameter representative of a temperature of the bicycle gearbox.

5. The data processing device according to claim 1, wherein the gear change signal contains at least one gear number parameter from the group of gear number parameters including a gear number parameter representative of the gear number of the one engaged gear, and a gear number parameter representative of the gear number of the gear to be engaged.

6. The data processing device according to claim 5, wherein the data processing device is configured to determine a switching direction on the basis of the gear number parameter of the one gear and of the gear number parameter of the other switching parameter.

7. The data processing device according to claim 1, wherein the data processing device has a transfer function through which the at least one switching parameter has assigned thereto an actuation signal.

8. The data processing device according to claim 1, wherein the data processing device is configured, to receive the gear change signal and/or generate it itself, depending on at least one switching parameter.

9. A control device for controlling the gear change in a bicycle gearbox, in particular a bottom bracket gearshift device or a hub gear, for a bicycle with or without an auxiliary motor, wherein the control device includes:

a data processing device according to claim 1; and a first clutch actuator and at least a second clutch actuator, wherein the first clutch actuator and the second clutch actuator are adapted to be connected to the data processing device in a data-transmitting manner and are configured such that they are adapted to be actuated depending on the actuation signal.

10. The control device according to claim 9, wherein the control device includes:

an actuating element accessible to a cyclist and configured to generate the gear change signal when actuated by the cyclist.

11. The control device according to claim 9, wherein the control device includes at least one sensor system for detecting the at least one switching parameter.

12. The control device according to claim 11, wherein the at least one sensor system is included in the following group of sensor systems:

a sensor system configured to detect a torque applied to at least one gear shaft of the bicycle gearbox, a sensor system configured to detect a rotation rate of at least one gear shaft of the bicycle gearbox, a sensor system configured to detect an angular position of at least one gear shaft of the bicycle gearbox, a sensor system configured to detect a drive power applied to at least one gear shaft of the bicycle gearbox, a sensor system configured to detect a position of the first clutch actuator and/or the second clutch actuator, a sensor system configured to detect a switching force generated by the first clutch actuator and/or the second clutch actuator, a sensor system configured to detect a switching power supplied to the first clutch actuator and/or the second clutch actuator, a sensor system configured to detect a speed of movement of the first clutch actuator and/or the second clutch actuator, a sensor system detecting a rotation rate of a control shaft of the bicycle gearbox, which has arranged thereon clutches that are actuatable by the first and/or the second clutch actuator, a sensor system detecting an angular position of the control shaft, or a sensor system detecting a temperature of the bicycle gearbox.

13. The control device according to claim 9, wherein the control device includes at least one embedded system, which is configured to control the switching movement of a clutch actuator, wherein the at least one embedded system is part of the data processing device or is connected to the data processing device in a data-transmitting manner.

14. A bicycle gearbox, in particular a bottom bracket gearshift device and/or a hub gear, for a bicycle with or without an auxiliary motor, wherein the bicycle gearbox includes:

a first clutch configured to be switched between an engaged and a disengaged actuation state;

at least a second clutch configured to be switched between an engaged and a disengaged actuation state;

a first clutch actuator for changing the actuation state of the first clutch;

at least a second clutch actuator for changing the actuation state of the second clutch;

a first gear wheel pairing including a first gear wheel, the fixation of the first gear wheel relative to an element of the bicycle gearbox being dependent on the actuation state of the first clutch;

a second gear wheel pairing including a second gear wheel, the fixation of the second gear wheel relative to an element of the bicycle gearbox being dependent on the actuation state of the second clutch;

wherein changing each of the first clutch and the second clutch from one actuation state to another actuation state results in a gear change; and a data processing device according to claim 1.

15. The bicycle gearbox according to claim 14, wherein the bicycle gearbox includes a first partial gearbox and a second partial gearbox, and the first clutch is located in the first partial gearbox and the second clutch is located in the second partial gearbox.

16. The bicycle gearbox according to claim 14, wherein the first clutch and the second clutch are configured as a switchable freewheel.

17. A bicycle with or without an auxiliary motor, including a bicycle gearbox according to claim 14.

18. A computer-implemented method for controlling a gear change in a bicycle gearbox for a bicycle with or without an auxiliary motor, in particular a bottom bracket gearshift device and/or a hub gear, from one gear directly to another gear by automatic actuation of a first and at least a second clutch actuator, the method including the following steps:

receiving at least one switching parameter representative of a current state of the bicycle gearbox; and outputting an actuation signal for actuating the first clutch actuator and at least the second clutch actuator depending on the at least one switching parameter and a gear change signal representing a command for a gear change;

wherein the actuation signal contains control data which are representative of points in time in the future at which the first clutch actuator and/or the second clutch actuator will have executed or are to execute a switching movement required for the gear change, and/or of a time interval between the actuation of the first clutch actuator and the actuation of the second clutch actuator and/or of a switching speed of the first clutch actuator and a switching speed of the second clutch actuator.

19. A computer program product or a computer-readable data carrier including commands which, when executed by a computer, cause the computer to carry out the computer-implemented method according to claim 18.

\* \* \* \* \*